US008654447B2

(12) United States Patent
Morooka

(10) Patent No.: US 8,654,447 B2
(45) Date of Patent: Feb. 18, 2014

(54) IMAGE STABILIZATION ZOOM LENS

(75) Inventor: Masaru Morooka, Akishima (JP)

(73) Assignee: Olympus Imaging Corp., Tokyo (JP)

( * ) Notice: Subject to any disclaimer, the term of this patent is extended or adjusted under 35 U.S.C. 154(b) by 12 days.

(21) Appl. No.: 13/566,536

(22) Filed: Aug. 3, 2012

(65) Prior Publication Data

US 2013/0038946 A1   Feb. 14, 2013

(30) Foreign Application Priority Data

Aug. 11, 2011   (JP) ................................. 2011-175747

(51) Int. Cl.
*G02B 15/14*   (2006.01)
*G02B 27/64*   (2006.01)

(52) U.S. Cl.
USPC ............................. 359/683; 359/557; 359/684

(58) Field of Classification Search
USPC .......................................... 359/683, 684, 557
See application file for complete search history.

(56) References Cited

U.S. PATENT DOCUMENTS

2010/0295985 A1* 11/2010 Matsusaka .................... 348/345

FOREIGN PATENT DOCUMENTS

| JP | 2008-129238 | 6/2008 |
|---|---|---|
| JP | 2008-261996 | 10/2008 |
| JP | 2009-192771 | 8/2009 |
| JP | 2009-236973 | 10/2009 |
| JP | 2010-097127 | 4/2010 |
| JP | 2010-170084 | 8/2010 |
| JP | 2011-070220 | 4/2011 |
| JP | 2011-070222 | 4/2011 |
| JP | 2011-095504 | 5/2011 |
| JP | 2011-095505 | 5/2011 |

* cited by examiner

*Primary Examiner* — Scott J Sugarman
(74) *Attorney, Agent, or Firm* — Kenyon & Kenyon LLP

(57) ABSTRACT

During zooming from the wide angle end to the telephoto end, a first lens unit having a positive refractive power is fixed, a second lens unit having a negative refractive power moves toward the image side, a third lens unit having a positive refractive power moves toward the object side, a fourth lens having a negative refractive power unit moves, and a fifth lens unit having a positive refractive power is fixed. The first lens unit includes a reflecting member that bends the optical path by 90 degrees. The entirety of or at least a part of the fifth lens unit is shifted in directions transverse to the optical axis to stabilize a picked-up image when the optical system vibrates. The zoom lens satisfies the predetermined expressions.

8 Claims, 11 Drawing Sheets

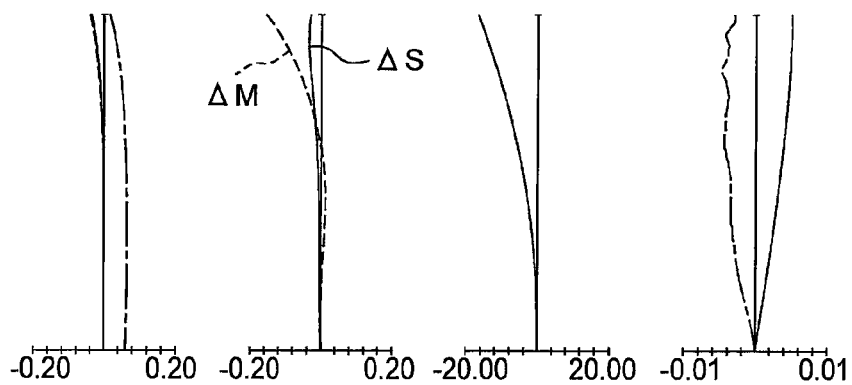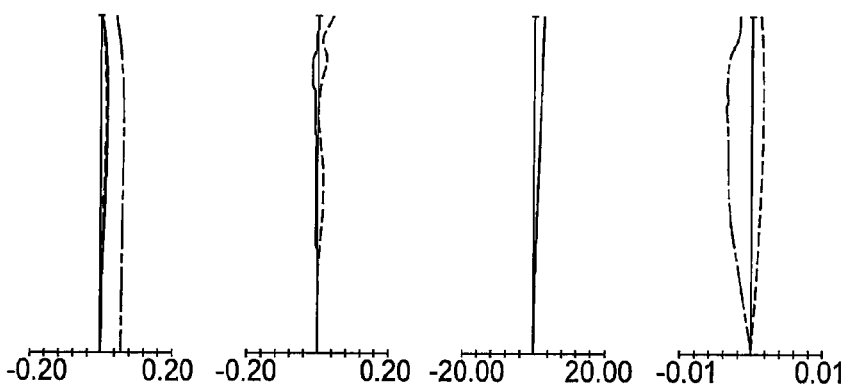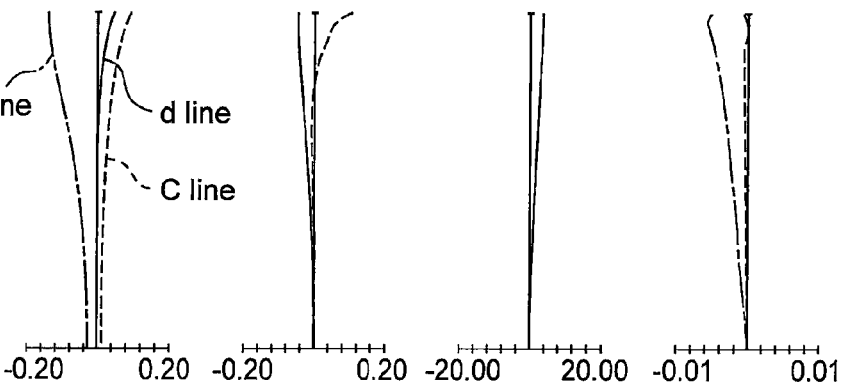

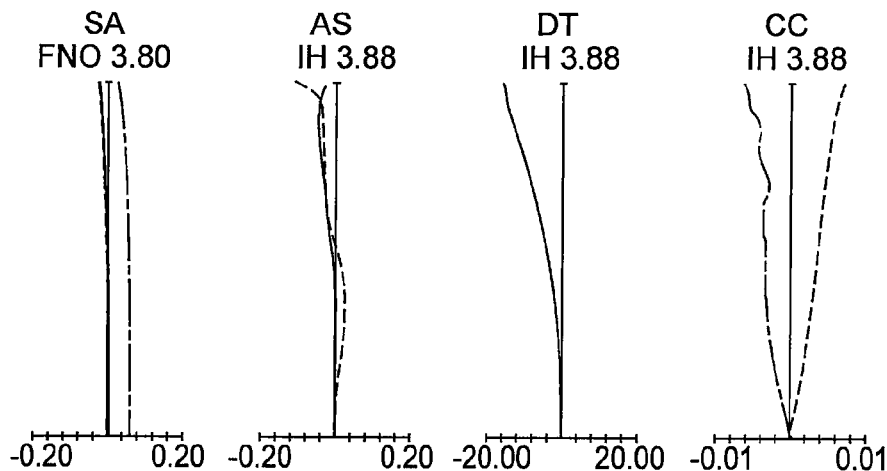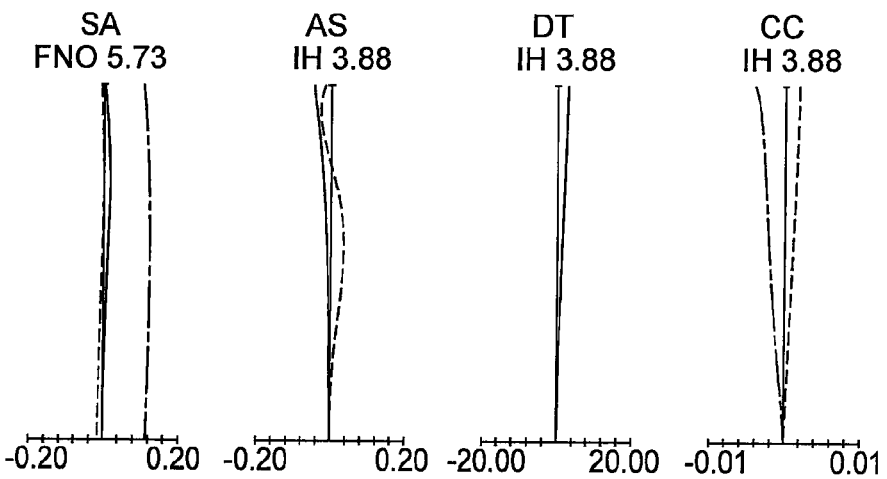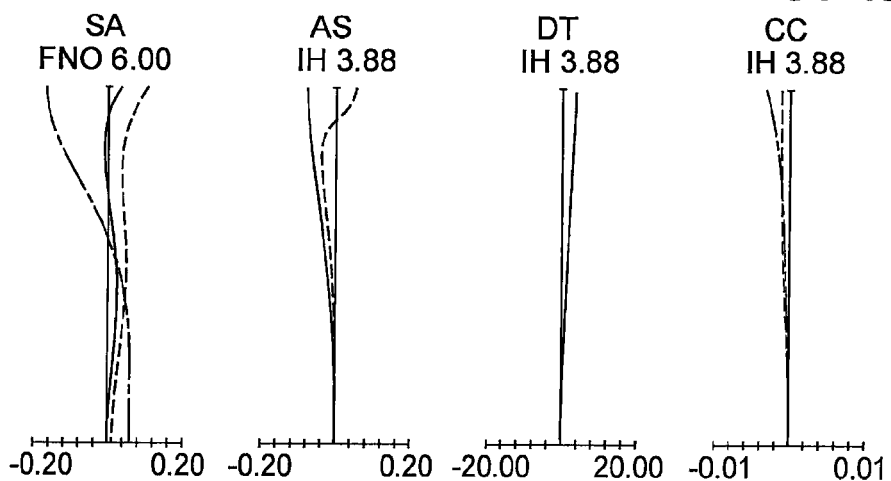

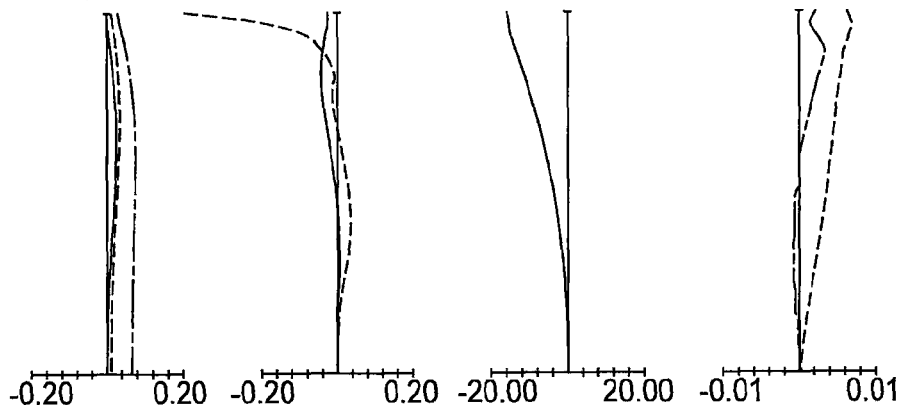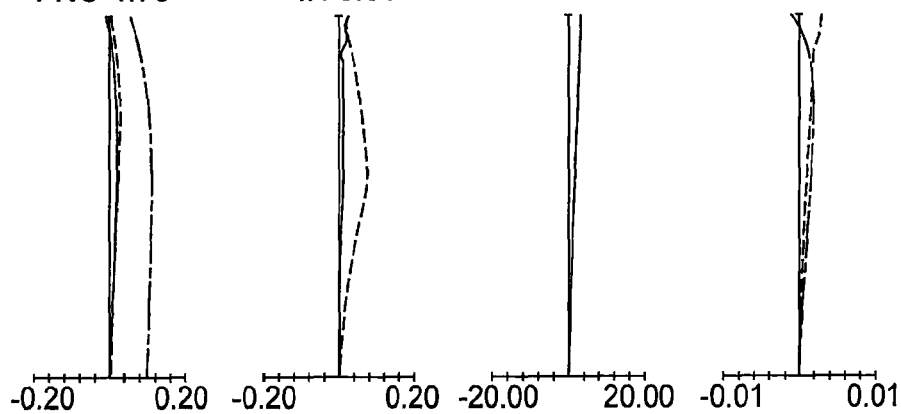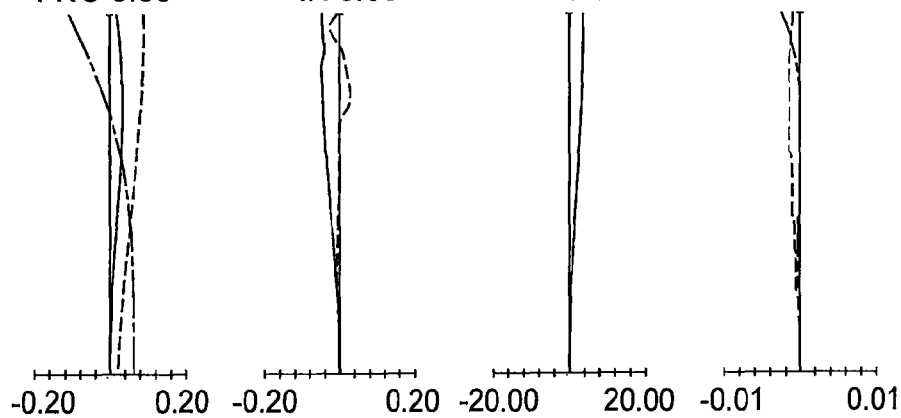

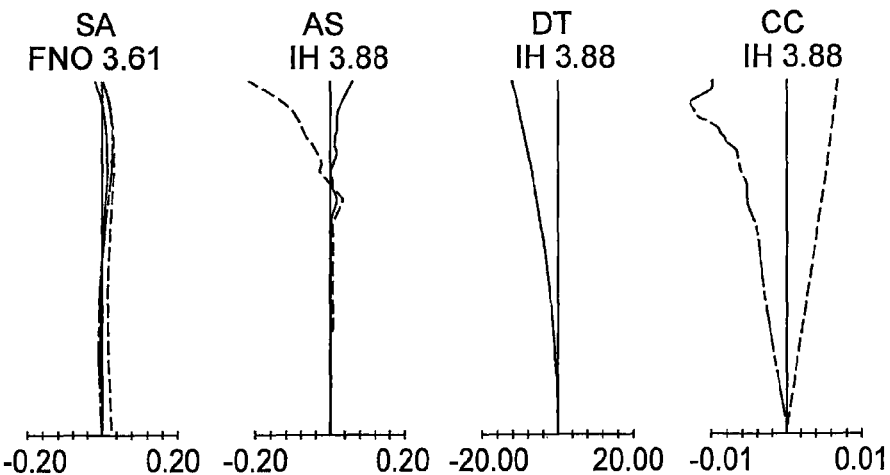
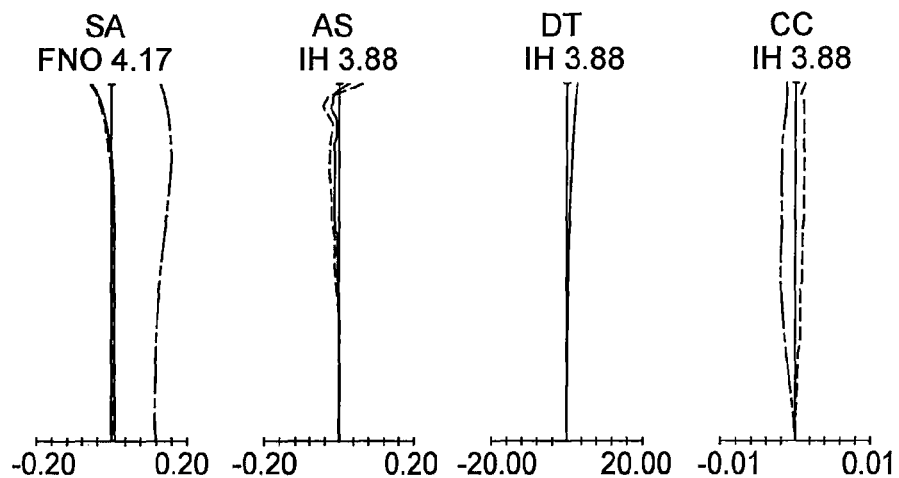
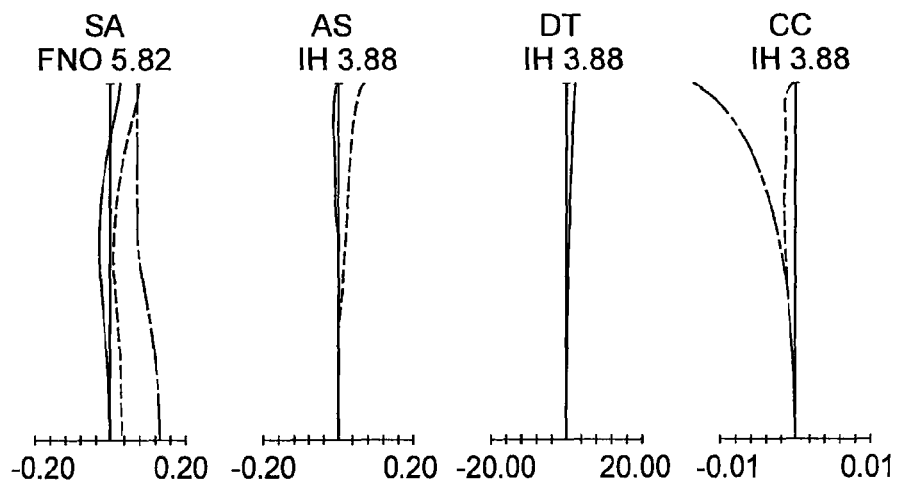

IMAGE STABILIZATION ZOOM LENS

CROSS-REFERENCE TO RELATED APPLICATION

The present application is based upon and claims the benefit of priority from the prior Japanese Patent Application No. 2011-175747 filed on Aug. 11, 2011; the entire contents of which are incorporated herein by reference.

BACKGROUND OF THE INVENTION

1. Field of the Invention

The present invention relates to a zoom lens, in particular to a small, wide-angle zoom lens having high zoom ratio for use in a video camera or digital camera.

2. Description of the Related Art

There is a demand for video cameras and digital cameras having a wide angle of view and high zoom ratio in recent years with an increase in the variety of application in shooting with such cameras. In addition, the size and thickness of zoom lenses for use in such cameras have been made smaller.

To achieve reduction in the size of zoom lenses with respect to the direction along the optical axis, various optical systems having a prism that bends the optical path provided in the lens unit closest to the object side of the optical system have been developed.

Slimming and size reduction of taking optical systems lead to weight reduction of cameras, which can sometimes lead to deterioration in image quality caused by camera shake in hand-held shooting. Many zoom lenses in which one or more lenses in the optical system are shifted in directions perpendicular to the optical axis to cancel blur of picked-up images have been developed.

Japanese Patent Application Laid-Open Nos. 2008-261996, 2009-192771, 2010-097127, 2011-070220, and 2011-070222 disclose prior art optical systems having a prism provided in the lens unit closest to the object side to bend the optical path, in which one or more of lenses in the optical system are shifted in directions perpendicular to the optical axis to stabilize image.

Japanese Patent Application Laid-Open Nos. 2009-236973, 2011-095504, 2008-129238, 2010-170084, and 2011-095505 disclose optical systems having a prism provided in the lens unit closest to the object side to bend the optical path. The optical systems disclosed in these patent documents are zoom lenses including five lens units having, in order from the object side, positive, negative, positive, negative, and positive refractive powers respectively. This configuration contributes to reduction in the size of the optical system.

SUMMARY OF THE INVENTION

A zoom lens according to a first aspect of the present invention comprises, in order from the object side:
a first lens unit having a positive refractive power;
a second lens unit having a negative refractive power;
a third lens unit having a positive refractive power;
a forth lens unit having a negative refractive power; and
a fifth lens unit having a positive refractive power, wherein during zooming from the wide angle end to the telephoto end, the first lens unit is fixed, the second lens unit moves toward the image side, the third lens unit moves toward the object side, the fourth lens unit moves, and the fifth lens unit is fixed,
the first lens unit comprises a reflecting member that bends the optical path by 90 degrees,
the entirety of or at least a part of the fifth lens unit is shifted in directions transverse to the optical axis to stabilize a picked-up image when the optical system vibrates, and
the zoom lens satisfies the following conditional expressions (1) and (2):

$$0.28 < 1-\beta_5 < 1.0 \qquad (1), \text{and}$$

$$-2.2 < f_4/f_w < -1.0 \qquad (2),$$

where $\beta_5$ is the image magnification of the fifth lens unit in the entire zoom range with the zoom lens being focused on an object point at infinity, $f_4$ is the focal length of the fourth lens unit, and $f_w$ is the focal length of the entire zoom lens system at the wide angle end.

A zoom lens according to a second aspect of the present invention comprises, in order from the object side:
a first lens unit having a positive refractive power;
a second lens unit having a negative refractive power;
a third lens unit having a positive refractive power;
a forth lens unit having a positive refractive power;
a fifth lens unit having a negative refractive power; and
a sixth lens unit having a positive refractive power, wherein during zooming from the wide angle end to the telephoto end, the first lens unit is fixed, the second lens unit moves toward the image side, the third lens unit is fixed, the fourth lens unit moves toward the object side, the fifth lens unit moves, and the sixth lens unit is fixed,
the first lens unit comprises a reflecting member that bends the optical path by 90 degrees,
the entirety of or at least a part of the sixth lens unit is shifted in directions transverse to the optical axis to stabilize a picked-up image when the optical system vibrates, and
the zoom lens satisfies the following conditional expressions (6), (7), and (8):

$$0.34 < 1-\beta_6 < 1.0 \qquad (6),$$

$$1.6 < f_4/f_w < 2.6 \qquad (7), \text{and}$$

$$-3.0 < f_5/f_w < -1.3 \qquad (8),$$

where $\beta_6$ is the image magnification of the sixth lens unit in the entire zoom range with the zoom lens being focused on an object point at infinity, $f_4$ is the focal length of the fourth lens unit, $f_5$ is the focal length of the fifth lens unit, and $f_w$ is the focal length of the entire zoom lens system at the wide angle end.

BRIEF DESCRIPTION OF THE DRAWINGS

FIGS. 2A, 2B, 2C, 2D, 2E, 2F, 2G, 2H, 2I, 2J, 2K, and 2L are aberration diagrams of the zoom lens according to the first embodiment in the state in which the zoom lens is focused on an object point at infinity;

FIGS. 4A, 4B, 4C, 4D, 4E, 4F, 4G, 4H, 4I, 4J, 4K, and 4L are aberration diagrams of the zoom lens according to the second embodiment in the state in which the zoom lens is focused on an object point at infinity;

FIGS. 6A, 6B, 6C, 6D, 6E, 6F, 6G, 6H, 6I, 6J, 6K, and 6L are aberration diagrams of the zoom lens according to the third embodiment in the state in which the zoom lens is focused on an object point at infinity;

FIGS. 8A, 8B, 8C, 8D, 8E, 8F, 8G, 8H, 8I, 8J, 8K, and 8L are aberration diagrams of the zoom lens according to the fourth embodiment in the state in which the zoom lens is focused on an object point at infinity;

DETAILED DESCRIPTION OF THE INVENTION

Figure 1A:
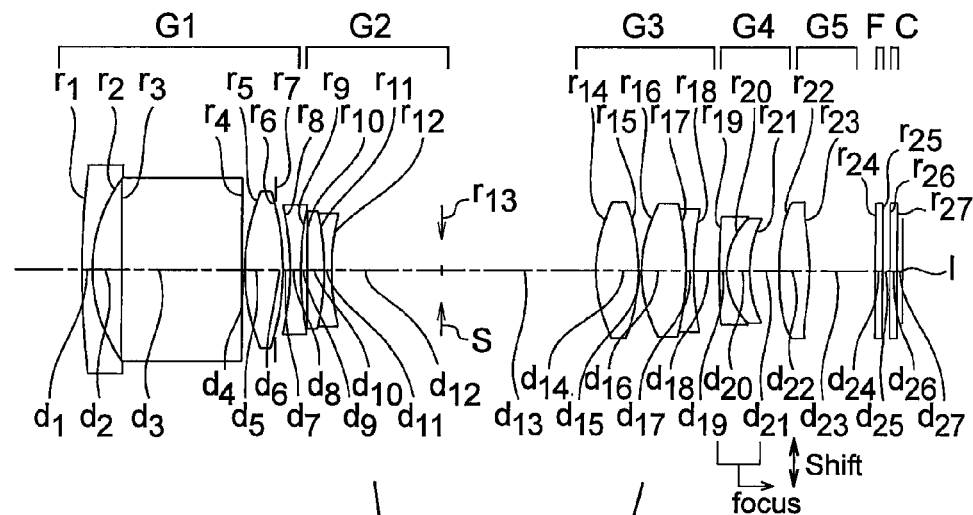
FIGS. 1A, 1B, and 1C are cross sectional views taken along the optical axis, showing the construction of a zoom lens according to a first embodiment of the present invention in the state in which the zoom lens is focused on an object point at infinity, respectively at the wide angle end, in an intermediate focal length state, and at the telephoto end.

A zoom lens according to a first mode comprises, in order from the object side:
a first lens unit having a positive refractive power;
a second lens unit having a negative refractive power;
a third lens unit having a positive refractive power;
a forth lens unit having a negative refractive power; and
a fifth lens unit having a positive refractive power, wherein
during zooming from the wide angle end to the telephoto end, the first lens unit is fixed, the second lens unit moves toward the image side, the third lens unit moves toward the object side, the fourth lens unit moves, and the fifth lens unit is fixed,
the first lens unit comprises a reflecting member that bends the optical path by 90 degrees,
the entirety of or at least a part of the fifth lens unit is shifted in directions transverse to the optical axis to stabilize a picked-up image when the optical system vibrates, and
the zoom lens satisfies the following conditional expressions (1) and (2):

$$0.28 < 1 - \beta_5 < 1.0 \quad (1), \text{and}$$

$$-2.2 < f_4/f_w < -1.0 \quad (2),$$

where $\beta_5$ is the image magnification of the fifth lens unit in the entire zoom range with the zoom lens being focused on an object point at infinity, $f_4$ is the focal length of the fourth lens unit, and $f_w$ is the focal length of the entire zoom lens system at the wide angle end.

The zoom lens according to the first mode has a positive-lead type zoom lens design in which a lens unit having a positive refractive power is arranged closest to the object side. This lens arrangement is advantageous for achieving high zoom ratio and suitable for wide-angle, high-zoom-ratio zoom lenses. The zooming can be performed mainly by changing the distance between the first lens unit and the second lens unit, the distance between the second lens unit and the third lens unit, and the distance between the third lens unit and the fourth lens unit. In addition, providing the fifth lens unit having a positive refractive power allows appropriate positioning of the exit pupil and reduction in the size of the first to fourth lens units. Therefore, this configuration is advantageous for small size zoom lenses.

During zooming, the distance between the first lens unit and the second lens unit is increased to change the magnification. By moving the second lens unit in such a way as to decrease the distance between it and the third lens unit, the position of the entrance pupil at the telephoto end of the zoom range can be set appropriately, and the lens diameter can be made small. In addition, by moving the third lens unit, the third lens unit can share the magnification changing function with the first and second lens units, allowing a reduction in the amount of movement of the second lens unit during zooming. This enables a reduction in the overall length of the zoom lens at the telephoto end. Moreover, by moving lens units during zooming in such a way that the distance between the third lens unit and the fourth lens unit and the distance between the fourth lens unit and the fifth lens unit increase, they can provide the magnification changing function. Thus, a high zoom ratio can be attained. The zoom lens according to the first mode has the first and fifth lens units that are fixed during zooming. Therefore, the frame structure of the zoom lens can be made simple, and the zoom lens can easily be made small.

Conditional expression (1) limits the image magnification of the fifth lens unit. If conditional expression (1) is satisfied, the amount of shift of the image with a shift of the fifth lens unit in a direction perpendicular to the optical axis can be set appropriately.

If the upper limit of conditional expression (1) is exceeded, the sensitivity of the shift of the image on the image plane to the shift of the fifth lens unit in a direction perpendicular to the optical axis will become unduly high. Then, highly precise control is required, and it will be difficult to keep the positional precision.

On the other hand, if the lower limit of conditional expression (1) is not reached, the sensitivity of the shift of the image on the image plane to the shift of the fifth lens unit in a direction perpendicular to the optical axis will become unduly low. This necessitates a large amount of shift of the fifth lens unit for shifting the image on the image plane, contrary to intended size reduction.

It is preferred, in order to make the frame structure simple, that the fifth lens unit includes at least one positive lens. When the fifth lens unit includes a plurality of lenses, shifting the at least one positive lens in the fifth lens unit in directions perpendicular to the optical axis can make variations in aberrations upon image stabilization small.

A driving mechanism for shifting the fifth lens unit and a control system for setting the shift amount for the driving mechanism based on output of a detection system for detecting image vibration may be used in combination. Thus, an image stabilization zoom optical system having the image stabilizing function can be achieved.

In the zoom lens according to the first mode, it is preferred, in order to achieve a high zoom ratio, that the fourth lens unit be moved during zooming from the wide angle end to the telephoto end in such a way that the distance between the third lens unit and the fourth lens unit and the distance between the fourth lens unit and the fifth lens unit increase. To this end, it is necessary that the refractive power of the fourth lens unit be set appropriately to satisfy conditional expression (2).

If the upper limit of conditional expression (2) is exceeded, while the amount of movement of the fourth lens unit can be made small, image plane variation in the telephoto focal length range will become large. Then, it will be difficult to achieve satisfactory performance throughout the entire zoom range.

If the lower limit of conditional expression (2) is not reached, image plane variation in the wide angle focal length range will become large. Then, it will be difficult to achieve excellent optical performance. Moreover, a large amount of movement of the fourth lens unit during zooming will be necessitated, and it will be difficult to make the size of the zoom lens small.

It is preferred that the zoom lens according to the first mode satisfies the following conditional expression (3):

$$2.0 < f_1/f_w < 3.4 \qquad (3),$$

where $f_1$ is the focal length of the first lens unit.

Conditional expression (3) appropriately limits the focal length of the first lens unit. If conditional expression (3) is satisfied, smallness in size and excellent performance can be achieved.

If the focal length of the first lens unit is so long that the upper limit of conditional expression (3) is exceeded, the refractive power of the first lens unit becomes low. Then, the overall lens length will become large, contrary to intended size reduction.

If the focal length of the first lens unit is so short that the lower limit of conditional expression (3) is not reached, the refractive power of the first lens unit becomes high. Then, it will be difficult to satisfactorily correct spherical aberration at the telephoto end.

It is preferred that the zoom lens according to the first mode satisfies the following conditional expression (4):

$$-3 < f_2/f_w < -1 \qquad (4),$$

where $f_2$ is the focal length of the second lens unit.

Conditional expression (4) appropriately limits the focal length of the second lens unit. If conditional expression (4) is satisfied, smallness in size and excellent performance can both be achieved.

If the upper limit of conditional expression (4) is exceeded, while correction of aberrations is facilitated, a large amount of movement of the second lens unit during zooming will be necessitated. Then, the overall lens length and the lens diameter will become large, contrary to intended size reduction.

If the lower limit of conditional expression (4) is not reached, the refractive power of the second lens unit becomes unduly large, making curvature of field and astigmatism generated by the second lens unit worse. Then, it will be necessary to increase the number of lenses and to use aspheric lens surfaces in order to correct these aberrations satisfactorily, and manufacturing errors in the second lens unit will adversely affect the performance to a larger extent.

It is preferred that the first lens satisfies the following conditional expression (5):

$$1.2 < f_3/f_w < 2.2 \qquad (5),$$

where $f_3$ is the focal length of the third lens unit.

Conditional expression (5) appropriately limits the focal length of the third lens unit. If conditional expression (5) is satisfied, smallness in size and excellent performance can both be achieved.

If the upper limit of conditional expression (5) is exceeded, while correction of aberrations is facilitated, a large amount of movement of the third lens unit during zooming will be necessitated. Then, the overall lens length and the lens diameter will become large, contrary to intended size reduction.

If the lower limit of conditional expression (5) is not reached, the refractive power of the third lens unit becomes unduly large, making spherical aberration and coma generated by the third lens unit worse. Then, it will be necessary to increase the number of lenses and to use aspheric lens surfaces in order to correct these aberrations satisfactorily, and manufacturing errors in the third lens unit will adversely affect the performance to a larger extent.

In the zoom lens according to the first mode, it is preferred that focusing from the infinite object distance to short distance be performed by moving the fourth lens unit.

Focusing by the fourth lens unit can make variation in aberrations relatively small.

A zoom lens according to a second mode comprises, in order from the object side:

a first lens unit having a positive refractive power;
a second lens unit having a negative refractive power;
a third lens unit having a positive refractive power;
a forth lens unit having a positive refractive power;
a fifth lens unit having a negative refractive power; and
a sixth lens unit having a positive refractive power, wherein
during zooming from the wide angle end to the telephoto end, the first lens unit is fixed, the second lens unit moves toward the image side, the third lens unit is fixed, the fourth lens unit moves toward the object side, the fifth lens unit moves, and the sixth lens unit is fixed,
the first lens unit comprises a reflecting member that bends the optical path by 90 degrees,
the entirety of or at least a part of the sixth lens unit is shifted in directions transverse to the optical axis to stabilize a picked-up image when the optical system vibrates, and
the zoom lens satisfies the following conditional expressions (6), (7), and (8):

$$0.34 < 1-\beta_6 < 1.0 \qquad (6),$$

$$1.6 < f_4/f_w < 2.6 \qquad (7), \text{ and}$$

$$-3.0 < f_5/f_w < -1.3 \qquad (8),$$

where $\beta_6$ is the image magnification of the sixth lens unit in the entire zoom range with the zoom lens being focused on an object point at infinity, $f_4$ is the focal length of the fourth lens unit, $f_5$ is the focal length of the fifth lens unit, and $f_w$ is the focal length of the entire zoom lens system at the wide angle end.

As with the zoom lens according to the first mode, the zoom lens according to the second mode has a positive-lead type zoom lens design in which a lens unit having a positive refractive power is arranged closest to the object side. This lens arrangement is advantageous for achieving high zoom ratio and suitable for wide-angle, high-zoom-ratio zoom lenses. The zooming can be performed mainly by changing the distance between the first lens unit and the second lens unit, the distance between the third lens unit and the fourth lens unit, and the distance between the fourth lens unit and the fifth lens unit. In addition, providing the sixth lens unit having a positive refractive power allows appropriate positioning of the exit pupil and reduction in the size of the first to fifth lens units. Therefore, this configuration is advantageous for small size zoom lenses.

During zooming, the distance between the first lens unit and the second lens unit is increased to change the magnification. By moving the second lens unit in such a way as to decrease the distance between it and the third lens unit, the position of the entrance pupil at the telephoto end of the zoom range can be set appropriately, and the lens diameter can be made small.

In addition, by moving the fourth lens unit, the fourth lens unit can share the magnification changing function with the first and second lens units, allowing a reduction in the amount of movement of the second lens unit during zooming. This enables a reduction in the overall length of the zoom lens at the telephoto end.

Moreover, by moving lens units during zooming in such a way that the distance between the fourth lens unit and the fifth lens unit and the distance between the fifth lens unit and the sixth lens unit increase, they can provide the magnification changing function. Thus, a high zoom ratio can be attained.

The zoom lens according to the second mode has the first, third, and sixth lens units that are fixed during zooming. Therefore, the frame structure of the zoom lens can be made simple, and the zoom lens can easily be made small.

Conditional expression (6) limits the image magnification of the sixth lens unit. If conditional expression (6) is satisfied, the amount of shift of the image with a shift of the sixth lens unit in a direction perpendicular to the optical axis can be set appropriately.

If the upper limit of conditional expression (6) is exceeded, the sensitivity of the shift of the image on the image plane to the shift of the sixth lens unit in a direction perpendicular to the optical axis will become unduly high. Then, highly precise control is required, and it will be difficult to keep the positional precision.

If the lower limit of conditional expression (6) is not reached, the sensitivity of the shift of the image on the image plane to the shift of the sixth lens unit in a direction perpendicular to the optical axis will become unduly low. This necessitates a large amount of shift of the fifth lens unit for shifting the image on the image plane, contrary to intended size reduction.

Moreover, the focal length of the fourth lens unit is appropriately set by conditional expression (7). With this condition, smallness in size and excellent performance can be achieved.

If the upper limit of conditional expression (7) is exceeded, while correction of aberrations is facilitated, a large amount of movement of the fourth lens unit during zooming will be necessitated. Then, the overall lens length and the lens diameter will become large, contrary to intended size reduction.

If the lower limit of conditional expression (7) is not reached, the refractive power of the fourth lens unit becomes unduly large, making spherical aberration and coma generated by the fourth lens unit worse. Then, it will be necessary to increase the number of lenses and to use aspheric lens surfaces in order to correct these aberrations satisfactorily, and manufacturing errors in the fourth lens unit will adversely affect the performance to a larger extent.

In the zoom lens according to the second mode, it is preferred, in order to achieve a wide angle of view and a high zoom ratio, that the fifth lens unit be moved during zooming from the wide angle end to the telephoto end in such a way that the distance between the fourth lens unit and the fifth lens unit and the distance between the fifth lens unit and the sixth lens unit increase. To this end, it is necessary that the refractive power of the fifth lens unit be set appropriately to satisfy conditional expression (8).

If the upper limit of conditional expression (8) is exceeded, while the amount of movement of the fifth lens unit can be made small, image plane variation in the telephoto focal length range will become large. Then, it will be difficult to achieve satisfactory performance throughout the entire zoom range.

If the lower limit of conditional expression (8) is not reached, image plane variation in the wide angle focal length range will become large. Then, it will be difficult to achieve excellent optical performance. Moreover, a large amount of movement of the fifth lens unit during zooming will be necessitated, and it will be difficult to make the size of the zoom lens small.

It is preferred that the zoom lens according to the second mode satisfies the following conditional expression (9):

$$2.0 < f_1/f_w < 2.8 \tag{9},$$

where $f_1$ is the focal length of the first lens unit.

Conditional expression (9) appropriately limits the focal length of the first lens unit. If conditional expression (9) is satisfied, smallness in size and excellent performance can be achieved.

If the focal length of the first lens unit is so long that the upper limit of conditional expression (9) is exceeded, the refractive power of the first lens unit becomes low. Then, the overall lens length will become large, contrary to intended size reduction.

If the focal length of the first lens unit is so short that the lower limit of conditional expression (9) is not reached, the refractive power of the first lens unit becomes high. Then, it will be difficult to satisfactorily correct spherical aberration at the telephoto end.

In the zoom lens according to the second mode, it is preferred that focusing from the infinite object distance to short distance be performed by moving the fifth lens unit.

Focusing by the fifth lens unit can make variation in aberrations relatively small.

The operations and effects of zoom lenses and image pickup apparatuses according to some embodiments will be described. It should be understood that the present invention is not limited by the embodiments. Although a lot of specific details will be described in the following description of the embodiments for the purposes of illustration, various modifications and changes can be made to the details without departing from the scope of the invention. The illustrative embodiments of the invention will be described in the following without any intension of invalidating the generality of or imposing any limitations on the claimed invention.

In the following, first to fifth embodiments of the zoom lenses according to the above-described modes will be described. FIGS. 1A, 3A, 5A, 7A, and 9A are cross sectional views of the zoom lenses according to the first to fifth embodiments respectively in the state in which they are focused on an object point at infinity at the wide angle end. FIGS. 1B, 3B, 5B, 7B, and 9B are cross sectional views of the zoom lenses according to the first to fifth embodiments respectively in the state in which they are focused on an object point at infinity in an intermediate focal length state. FIGS. 1C, 3C, 5C, 7C, and 9C are cross sectional views of the zoom lenses according to the first to fifth embodiments respectively in the state in which they are focused on an object point at infinity at the telephoto end. In the cross sectional views of the zoom lenses, a first lens unit is denoted by G1, a second lens unit is denoted by G2, an aperture stop is denoted by S, a third lens unit is denoted by G3, a fourth lens unit is denoted by G4, a fifth lens unit is denoted by G5, a sixth lens unit is denoted by G6, a plane parallel plate constituting a low pass filter on which wavelength range restriction coating for restricting infrared light is applied is denoted by F, a plane parallel plate constituting a cover glass for an electronic image pickup element is denoted by C, and the image plane is denoted by I. The cover glass C may have a multi-layer film for wavelength range restriction applied on its surface. The cover glass C may be adapted to have the low-pass filtering function.

In all the zoom lenses according to the embodiments, the aperture stop S is fixed. All the numerical data presented below are for the state in which the zoom lens is focused on an object at infinity. In the numerical data, dimensions are in millimeters and angles are in degrees. In all the embodiments, focusing is performed moving the lens unit closest to the image side. Zoom data are given for the wide angle end, for the intermediate focal length state, and for the telephoto end. In the numerical data, the sign (positive/negative) of the refractive power is determined based on the paraxial radius of curvature.

A flare stop may be provided in addition to the aperture stop in order to eliminate unwanted light that may cause ghost images, lens flare or the like. The flare stop may be disposed on the object side of the first lens unit, between the first lens unit and the second lens unit, between the second lens unit and the third lens unit, between the third lens unit and the fourth lens unit, between the fourth lens unit and the fifth lens unit, between the fifth lens unit and the sixth lens unit, or between the sixth lens unit and the image plane. A frame member or other member may be adapted to cut rays that may cause lens flare. Alternatively, a flare stop may be provided on an optical component of the optical system by direct printing or by attaching a sticker. The aperture of the flare stop may have a circular, elliptical, rectangular, polygonal, or other shape, or the shape of the aperture may be defined by a curve specified by a mathematical function. The flare stop may be adapted to cut not only detrimental beams but also beams that may cause coma flare etc. in the peripheral region of the image.

Antireflection coating may be applied on each lens to reduce ghost images and lens flare. Multi-layer coating will reduce ghost images and lens flare effectively. Anti-reflection coating on the surfaces of lenses exposed to air is widely adopted to prevent ghost images and lens flare. Coating for cutting infrared light may be applied on a lens surface(s) and/or a surface(s) of the cover glass.

The refractive index of adhesives used on the cemented surface of cemented lenses is significantly higher than the refractive index of air. Consequently, the reflectivity of the cemented surface is as low as or lower than surfaces having single-layer coating in many cases. Therefore, antireflection coating is rarely applied to the cemented surface of cemented lenses. However, antireflection coating may be applied on the cemented surface. This will further reduce ghost images and lens flare, and better images can be obtained consequently.

Lens materials having a high refractive index that have been widely used recently are particularly advantageous in correcting aberrations. For this reason, lens materials having a high refractive index have been frequently used in camera optical systems. However, when a lens material having a high refractive index is used in a cemented lens, reflection on the cemented surface cannot be ignored. In such cases, it is particularly effective to apply anti-reflecting coating on the cemented surface. Effective use of coating on cemented surfaces is disclosed in patent documents such as Japanese Patent Application Laid-Open No. 2-27301, Japanese Patent Application Laid-Open No. 2001-324676, Japanese Patent Application Laid-Open No. 2005-92115, and U.S. Pat. No. 7,116,482.

The zoom lenses disclosed in these patent documents are positive-lead type zoom lenses, and these documents describe coating on cemented lens surfaces in the first lens unit. Coating may be applied to cemented lens surfaces in the first lens unit having a positive refractive power in the embodiments in a manner according to the aforementioned documents. Coating material may be selected appropriately based on the refractive index of the base lens and the refractive index of the adhesive. A coating material having a relatively high refractive power such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$ or a coating material having a relatively low refractive power such as $MgF_2$, $SiO_2$ or $Al_2O_3$ may be selected fitly, and the coating film thickness may be set appropriately to meet the phase condition.

Coating on cemented surfaces may be multi-layer coating as with coating on lens surfaces in contact with air, as a matter of course. By using two or more layers of coating materials in combination and selecting the each coating film thickness appropriately, the reflectance can further be reduced and spectral characteristics and angular characteristics of reflectance can be controlled. It is effective to apply coating also to cemented surfaces in lens units other than the first lens unit for the same reason.

It is preferred that focusing or focus adjustment be performed by moving the fifth or sixth lens unit. Since the lens (es) in these lens units is (are) light in weight, focusing with the fifth or sixth lens unit can be performed with small load on the motor. However, focusing may be performed by moving a lens unit other the fifth or sixth lens unit. A plurality of lens units may be moved for focusing. Alternatively, focusing may be performed by advancing the entire lens system. Still alternatively, focusing may be performed by advancing or retracting one or more lenses.

Figure 1B:
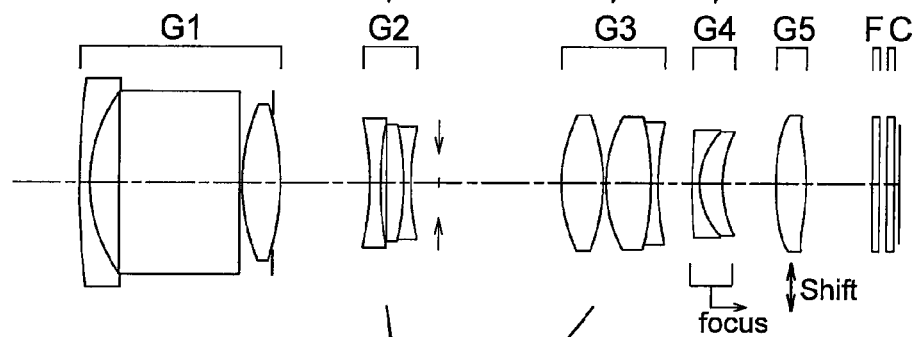
Figure 1C:
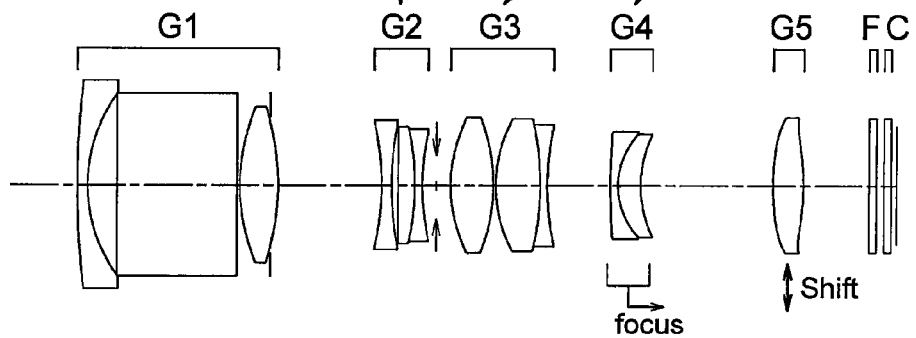

As shown in FIGS. 1A, 1B, and 1C, a zoom lens according to the first embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. Thus, the distance between the first lens unit G1 and the second lens unit G2 increases, the distance between the second lens unit G2 and the third lens unit G3 decreases, the distance between the third lens unit G3 and the fourth lens unit G4 changes, and the distance between the fourth lens unit G4 and the fifth lens unit G5 increases.

The first lens unit G1 is composed of a negative meniscus lens having a convex surface directed toward the object side, a reflecting member that bends the optical path by 90 degrees, and a biconvex positive lens. The second lens unit G2 is composed of an object side biconcave negative lens and a cemented lens made up of a biconvex positive lens and a biconcave negative lens. The third lens unit G3 is composed of a biconvex positive lens and a cemented lens made up of a biconvex positive lens and a biconcave negative lens. The fourth lens unit G4 is composed of a cemented lens made up of a negative meniscus lens having a convex surface directed toward the object side and a positive meniscus lens having a convex surface directed toward the object side. The fifth lens unit G5 is composed of a biconvex positive lens. All the optical elements in each lens unit are arranged in the mentioned order from the object side.

The biconvex positive lens in the fifth lens unit G5 is shifted in directions perpendicular to the optical axis to shift the image.

There are nine aspheric surfaces, which include both surfaces of the biconvex positive lens in the first lens unit, both surfaces of the biconcave negative lens in the second lens unit, both surfaces of the biconvex positive lens in the third lens unit, the image side surface of the cemented lens made up of the negative meniscus lens having a convex surface directed toward the object side and the positive meniscus lens having a convex surface directed toward the object side in the fourth lens unit, and both surfaces of the biconvex positive lens in the fifth lens unit.

Figure 3A:
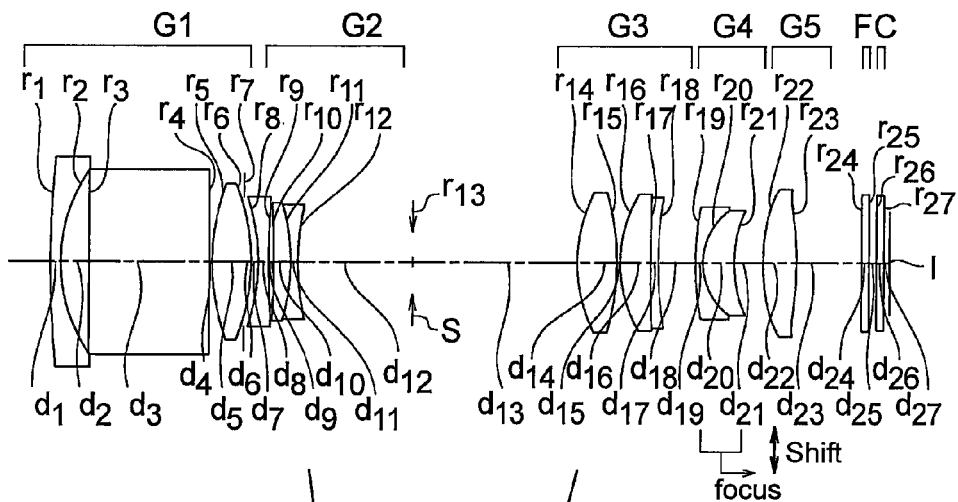
FIGS. 3A, 3B, and 3C are cross sectional views taken along the optical axis, showing the construction of a zoom lens according to a second embodiment of the present invention in the state in which the zoom lens is focused on an object point at infinity, respectively at the wide angle end, in an intermediate focal length state, and at the telephoto end.
Figure 3B:
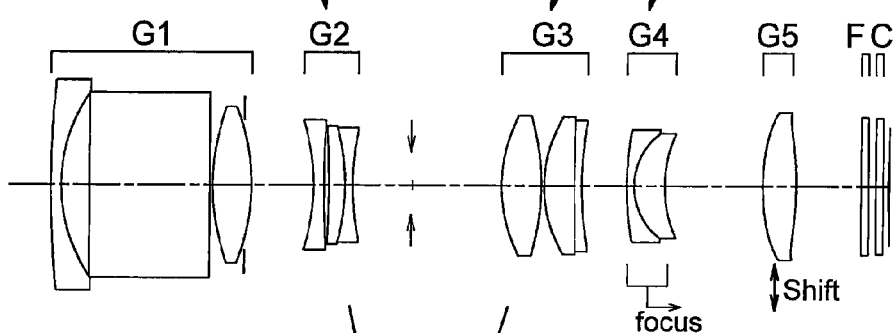
Figure 3C:
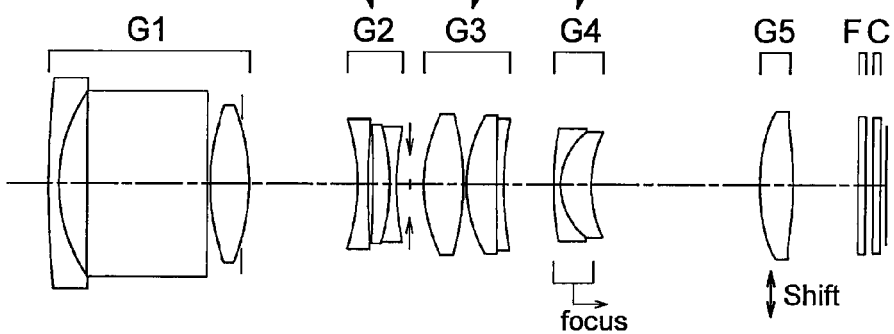

As shown in FIGS. 3A, 3B, and 3C, a zoom lens according to the second embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. Thus, the distance between the first lens unit G1 and the second lens unit G2 increases, the distance between the second lens unit G2 and the third lens unit G3 decreases, the distance between the third lens unit G3 and the fourth lens unit G4 changes, and the distance between the fourth lens unit G4 and the fifth lens unit G5 increases.

The first lens unit G1 is composed of a negative meniscus lens having a convex surface directed toward the object side, a reflecting member that bends the optical path by 90 degrees, and a biconvex positive lens. The second lens unit G2 is composed of an object side biconcave negative lens and a cemented lens made up of a positive meniscus lens having a concave surface directed toward the object side and a biconcave negative lens. The third lens unit G3 is composed of a biconvex positive lens and a cemented lens made up of a positive meniscus lens having a convex surface directed toward the object side and a negative meniscus lens having a convex surface directed toward the object side. The fourth lens unit G4 is composed of a cemented lens made up of a negative meniscus lens having a convex surface directed toward the object side and a positive meniscus lens having a convex surface directed toward the object side. The fifth lens unit G5 is composed of a biconvex positive lens. All the optical elements in each lens unit are arranged in the mentioned order from the object side.

The biconvex positive lens in the fifth lens unit is shifted in directions perpendicular to the optical axis to shift the image.

There are nine aspheric surfaces, which include both surfaces of the biconvex positive lens in the first lens unit, both surfaces of the biconcave negative lens in the second lens unit, both surfaces of the biconvex positive lens in the third lens unit, the image side surface of the cemented lens made up of the negative meniscus lens having a convex surface directed toward the object side and the positive meniscus lens having a convex surface directed toward the object side in the fourth lens unit, and both surfaces of the biconvex positive lens in the fifth lens unit.

Figure 5A:
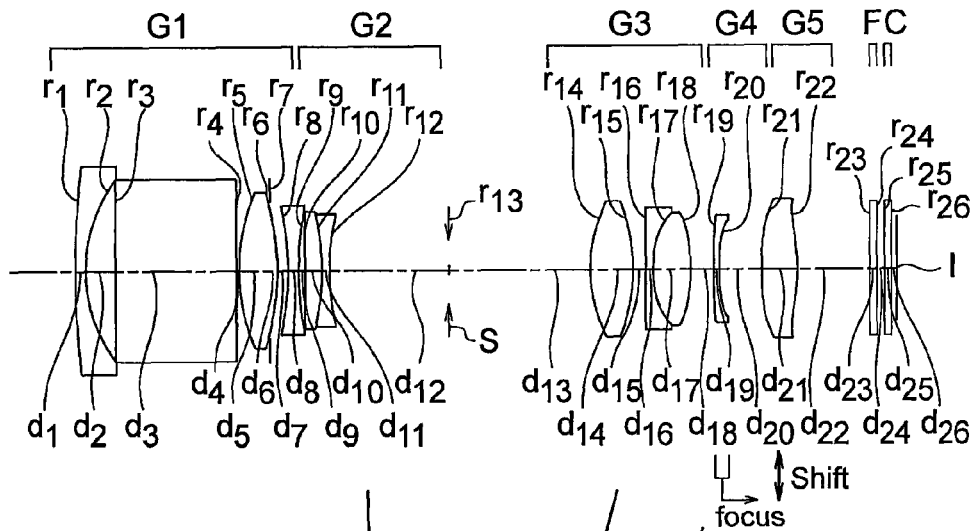
FIGS. 5A, 5B, and 5C are cross sectional views taken along the optical axis, showing the construction of a zoom lens according to a third embodiment of the present invention in the state in which the zoom lens is focused on an object point at infinity, respectively at the wide angle end, in an intermediate focal length state, and at the telephoto end.
Figure 5B:
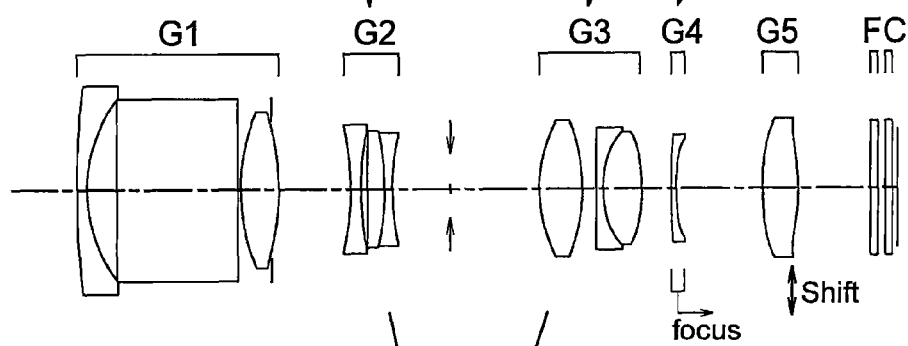
Figure 5C:
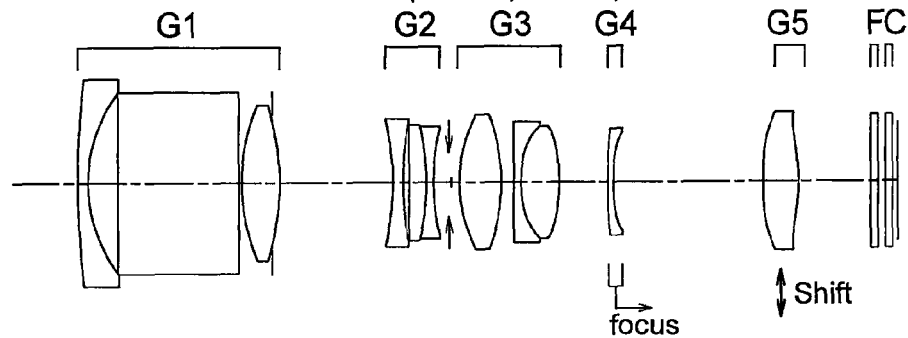

As shown in FIGS. 5A, 5B, and 5C, a zoom lens according to the third embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. Thus, the distance between the first lens unit G1 and the second lens unit G2 increases, the distance between the second lens unit G2 and the third lens unit G3 decreases, the distance between the third lens unit G3 and the fourth lens unit G4 changes, and the distance between the fourth lens unit G4 and the fifth lens unit G5 increases.

The first lens unit G1 is composed of a negative meniscus lens having a convex surface directed toward the object side, a reflecting member that bends the optical path by 90 degrees, and a biconvex positive lens. The second lens unit G2 is composed of an object side biconcave negative lens and a cemented lens made up of a positive meniscus lens having a concave surface directed toward the object side and a biconcave negative lens. The third lens unit G3 is composed of a biconvex positive lens and a cemented lens made up of a negative meniscus lens having a convex surface directed toward the object side and a biconvex positive lens. The fourth lens unit G4 is composed of a negative lens having a higher curvature on the object side. The fifth lens unit G5 is composed of a biconvex positive lens. All the optical elements in each lens unit are arranged in the mentioned order from the object side.

The biconvex positive lens in the fifth lens unit is shifted in directions perpendicular to the optical axis to shift the image.

There are eleven aspheric surfaces, which include both surfaces of the biconvex positive lens in the first lens unit, both surfaces of the biconcave negative lens in the second lens unit, both surfaces of the biconvex positive lens in the third lens unit, the image side surface of the cemented lens made up of the negative meniscus lens having a convex surface directed toward the object side and the biconvex positive lens in the third lens unit, both surfaces of the negative meniscus lens having a convex surface directed toward the object side in the fourth lens unit, and both surfaces of the biconvex positive lens in the fifth lens unit.

Figure 7A:
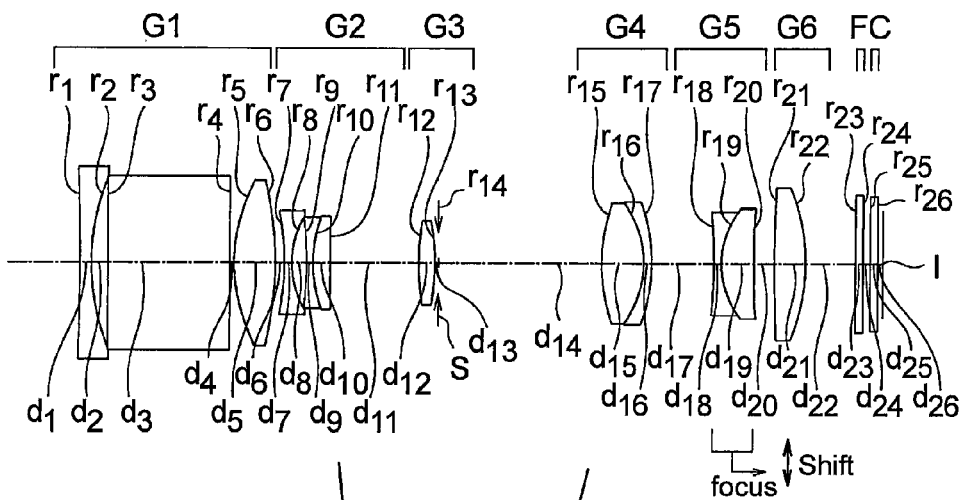
FIGS. 7A, 7B, and 7C are cross sectional views taken along the optical axis, showing the construction of a zoom lens according to a fourth embodiment of the present invention in the state in which the zoom lens is focused on an object point at infinity, respectively at the wide angle end, in an intermediate focal length state, and at the telephoto end.
Figure 7B:
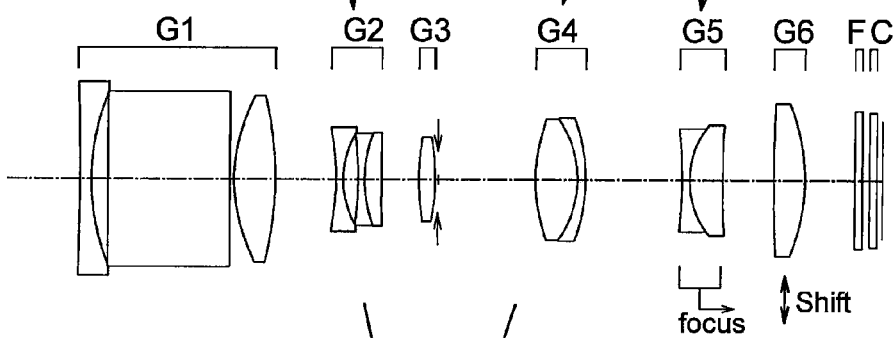
Figure 7C:
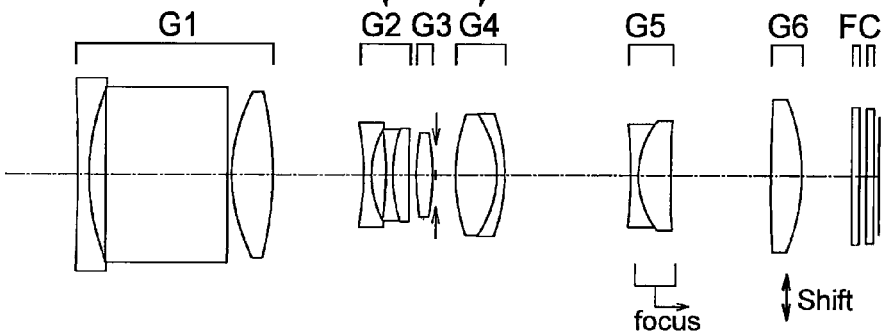

As shown in FIGS. 7A, 7B, and 7C, a zoom lens according to the fourth embodiment includes, in order from the object side, a first lens unit G1 having a positive refractive power, a second lens unit G2 having a negative refractive power, a third lens unit G3 having a positive refractive power, an aperture stop S, a fourth lens unit G4 having a positive refractive power, a fifth lens unit having a negative refractive power, and a sixth lens unit having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves toward the object side, and the sixth lens unit G6 is fixed. Thus, the distance between the first lens unit G1 and the second lens unit G2 increases, the distance between the second lens unit G2 and the third lens unit G3 decreases, the distance between the third lens unit G3 and the fourth lens unit G4 decreases, the distance between the fourth lens unit G4 and the fifth lens unit G5 changes, and the distance between the fifth lens unit G5 and the sixth lens unit G6 increases.

The first lens unit G1 is composed of a biconcave negative lens, a reflecting member that bends the optical path by 90 degrees, and a biconvex positive lens. The second lens unit G2 is composed of a biconcave negative lens and a cemented lens made up of a biconcave negative lens and a positive meniscus lens having a convex surface directed toward the object side. The third lens unit G3 is composed of a biconvex positive lens. The fourth lens unit G4 is composed of a cemented lens made up of a biconvex positive lens and a negative meniscus lens having a concave surface directed toward the object side. The fifth lens unit G5 is composed of a cemented lens made up of a biconcave negative lens and a biconvex positive lens. The sixth lens unit G6 is composed of a biconvex positive lens. All the optical elements in each lens unit are arranged in the mentioned order from the object side.

The biconvex positive lens in the sixth lens unit is shifted in directions perpendicular to the optical axis to shift the image.

There are eight aspheric surfaces, which include both surfaces of the biconvex positive lens in the first lens unit, both surfaces of the biconcave negative lens in the second lens unit, both surfaces of the biconvex positive lens in the third lens unit, the object side surface of the cemented lens made up of the biconvex positive lens and the negative meniscus lens having a concave surface directed toward the object side in the fourth lens unit, and the image side surface of the cemented lens made up of the biconcave negative lens and the biconvex positive lens in the fifth lens unit.

Figure 9A:
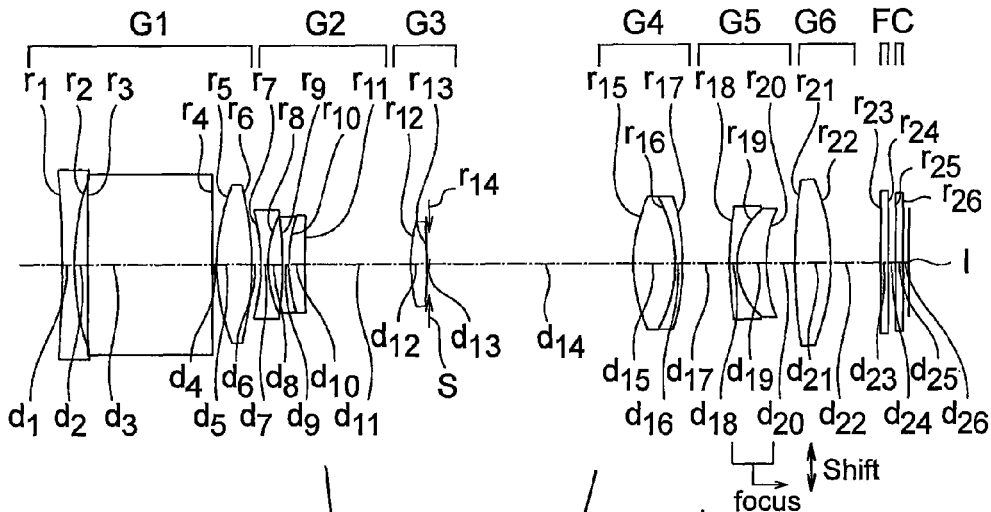
FIGS. 9A, 9B, and 9C are cross sectional views taken along the optical axis, showing the construction of a zoom lens according to a fifth embodiment of the present invention in the state in which the zoom lens is focused on an object point at infinity, respectively at the wide angle end, in an intermediate focal length state, and at the telephoto end.
Figure 9B:
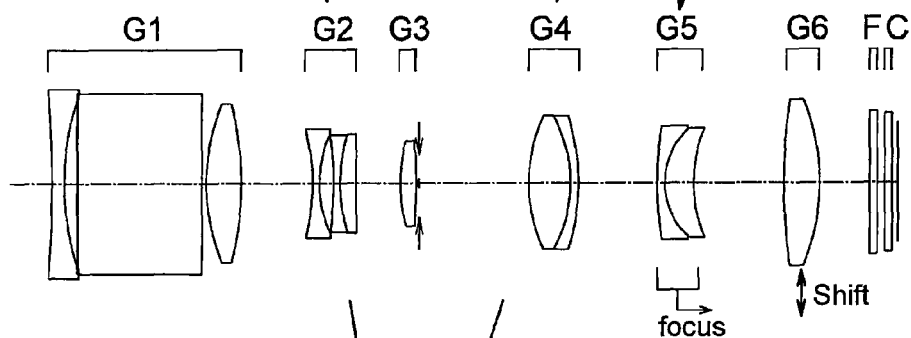
Figure 9C:
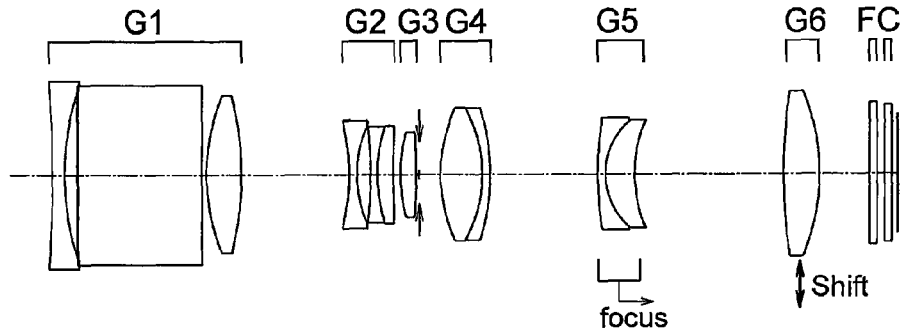
Figures 10A, 10B, 10C, 10D:
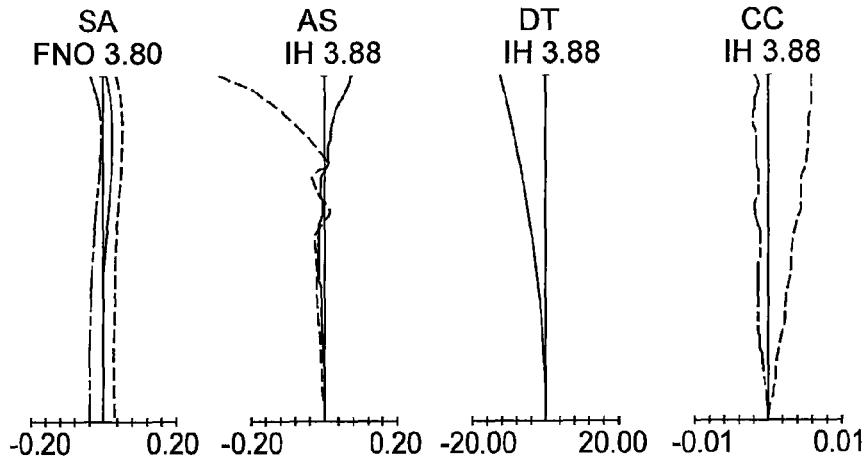
FIGS. 10A, 10B, 10C, 10D, 10E, 10F, 10G, 10H, 10I, 10J, 10K, and 10L are aberration diagrams of the zoom lens according to the fifth embodiment in the state in which the zoom lens is focused on an object point at infinity.
Figures 10E, 10F, 10G, 10H:
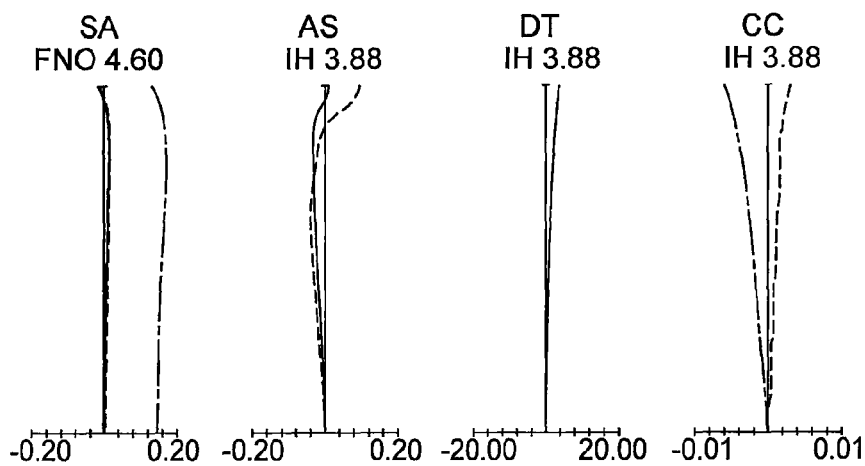
Figures 10I, 10J, 10K, 10L:
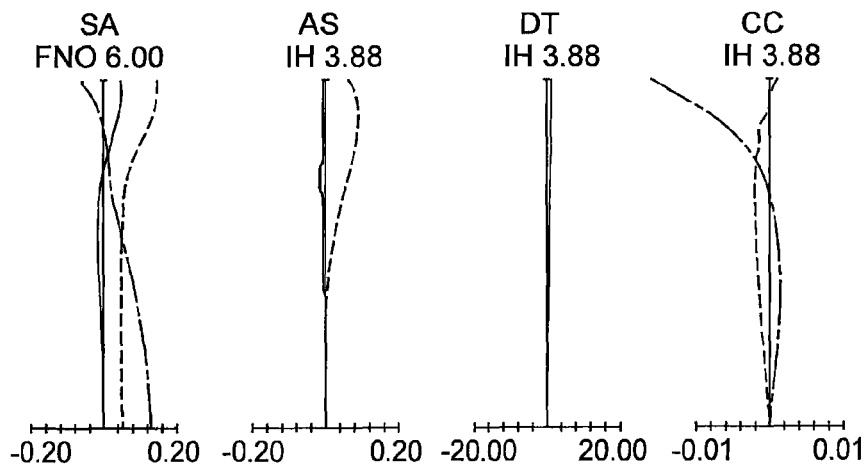

As shown in FIGS. 9A, 9B, and 9C, a zoom lens according to the fifth embodiment includes, in order from the object side, a first lens unit G1 having a positive refractive power, a second lens unit G2 having a negative refractive power, a third lens unit G3 having a positive refractive power, an aperture stop S, a fourth lens unit G4 having a positive refractive power, a fifth lens unit having a negative refractive power, and a sixth lens unit having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves toward the object side, and the sixth lens unit G6 is fixed. Thus, the distance between the first lens unit G1 and the second lens unit G2 increases, the distance between the second lens unit G2 and the third lens unit G3 decreases, the distance between the third lens unit G3 and the fourth lens unit G4 decreases, the distance between the fourth lens unit G4 and the fifth lens unit G5 changes, and the distance between the fifth lens unit G5 and the sixth lens unit G6 increases.

The first lens unit G1 is composed of a biconcave negative lens, a reflecting member that bends the optical path by 90 degrees, and a biconvex positive lens. The second lens unit G2 is composed of a biconcave negative lens and a cemented lens made up of a biconcave negative lens and a positive meniscus lens having a convex surface directed toward the object side. The third lens unit G3 is composed of a biconvex positive lens. The fourth lens unit G4 is composed of a cemented lens made up of a biconvex positive lens and a negative meniscus lens having a concave surface directed toward the object side. The fifth lens unit G5 is composed of a cemented lens made up of a negative meniscus lens having a convex surface directed toward the object side and a positive meniscus lens having a convex surface directed toward the object side. The sixth lens unit G6 is composed of a biconvex positive lens. All the optical elements in each lens unit are arranged in the mentioned order from the object side.

The biconvex positive lens in the sixth lens unit is shifted in directions perpendicular to the optical axis to shift the image.

There are eight aspheric surfaces, which include both surfaces of the biconvex positive lens in the first lens unit, both surfaces of the biconcave negative lens in the second lens unit, both surfaces of the biconvex positive lens in the third lens unit, the object side surface of the cemented lens made up of the biconvex positive lens and the negative meniscus lens having a concave surface directed toward the object side in the fourth lens unit, and the image side surface of the cemented lens made up of the negative meniscus lens having a convex surface directed toward the object side and the positive meniscus lens having a convex surface directed toward the object side in the fifth lens unit.

Numerical data of each embodiment described above is shown below. Apart from symbols described above, f denotes a focal length of an imaging optical system, fb denotes a back focus, f1, f2, . . . denotes a focal length of each lens unit, IH (FIY) denotes an image height, FNO denotes an F number, ω denotes a half image angle, "Wide angle" denotes a wide angle end, "Intermediate" denotes an intermediate state, "Telephoto" denotes a telephoto end, r denotes radius of curvature of each lens surface, d denotes a distance between two lenses, nd denotes a refractive index of each lens for a d-line, and νd denotes an Abbe's number for each lens. The overall length of the lens system which will be described later is a length which is obtained by adding the back focus to a distance from the first lens surface up to the last lens surface. "fb" (back focus) is a unit which is expressed upon air conversion of a distance from the last lens surface up to a paraxial image plane.

A shape of the aspheric surface is described by the following expression using each aspherical surface coefficient in each embodiment, when x is let to be an optical axis in which a light passing direction is let to be a positive direction, and y is let to be a direction orthogonal to the optical axis.

$$x=(y^2/r)/[1+\{1-(K+1)(y/r)^2\}^{1/2}]A_4y^4+A_6y^6+A_8y^8+A_{10}y^{10}+A_{12}y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

Unit mm

Surface data

| Surface no. | r | d | nd | νd |
|---|---|---|---|---|
| Object plane | ∞ | ∞ | | |
| 1 | 59.091 | 0.70 | 2.00069 | 25.46 |
| 2 | 10.477 | 1.98 | | |
| 3 | ∞ | 8.17 | 1.84666 | 23.78 |
| 4 | ∞ | 0.20 | | |
| 5* | 13.542 | 2.56 | 1.69350 | 53.20 |
| 6* | −16.795 | −0.50 | | |
| 7 | ∞ | Variable | | |
| 8* | −17.729 | 0.70 | 1.77377 | 47.17 |
| 9* | 23.283 | 0.43 | | |
| 10 | 1642.874 | 1.17 | 1.94595 | 17.98 |
| 11 | −17.961 | 0.50 | 1.77250 | 49.60 |
| 12 | 16.392 | Variable | | |
| 13(stop) | ∞ | Variable | | |
| 14* | 9.430 | 2.87 | 1.49650 | 81.53 |
| 15* | −12.041 | 0.20 | | |
| 16 | 9.542 | 3.00 | 1.49700 | 81.61 |
| 17 | −19.626 | 0.50 | 1.59551 | 39.24 |
| 18 | 19.947 | Variable | | |
| 19 | 50.287 | 0.50 | 1.85026 | 32.27 |
| 20 | 5.116 | 1.53 | 1.49700 | 81.61 |
| 21* | 8.795 | Variable | | |
| 22* | 23.052 | 2.04 | 1.53071 | 55.60 |
| 23* | −13.273 | 4.46 | | |
| 24 | ∞ | 0.50 | 1.51633 | 64.14 |
| 25 | ∞ | 0.50 | | |
| 26 | ∞ | 0.50 | 1.51633 | 64.14 |

-continued

Unit mm

| 27 | ∞ | Variable |
| Image plane (Light receiving surface) | ∞ | |

Aspherical surface data

5th surface k = 0.000
A4 = −7.53708e−04, A6 = −1.20450e−06, A8 = 3.62632e−09,
A10 = −9.37643e−12
6th surface k = 0.000
A4 = 1.14892e−04, A6 = −1.39815e−06, A8 = 1.07358e−08,
A10 = −2.72577e−11
8th surface k = 0.000
A4 = 6.06078e−05, A6 = 4.06286e−06, A8 = 2.09729e−07,
A10 = −8.29728e−09
9th surface k = 0.000
A4 = −9.59376e−05, A6 = 9.58126e−06, A8 = 2.94652e−07,
A10 = −3.72140e−09
14th surface k = 0.000
A4 = −2.55064e−04, A6 = −1.50354e−06, A8 = 1.10617e−07,
A10 = −2.84761e−09
15th surface k = 0.000
A4 = −1.44097e−04, A6 = −2.76995e−06, A8 = 1.89945e−07,
A10 = −3.77127e−09
21st surface k = 0.000
A4 = 4.15815e−04, A6 = 0.00000e−00, A8 = 0.00000e−00,
A10 = 0.00000e−00
22nd surface k = 0.000
A4 = 8.71631e−04, A6 = −2.87696e−05, A8 = 1.21878e−06,
A10 = 1.10744e−08
23rd surface k = 0.000
A4 = 1.10430e−03, A6 = −3.37750e−05, A8 = 8.30022e−07,
A10 = 3.65168e−08

Zoom data

| | Wide angle | Intermediate | Telephoto |
|---|---|---|---|
| Focal length | 5.11 | 10.98 | 24.44 |
| Fno. | 3.60 | 4.23 | 5.90 |
| Angle of field 2ω | 84.60 | 37.82 | 17.36 |
| fb (in air) | 5.99 | 5.99 | 5.99 |
| Lens total length (in air) | 55.15 | 55.15 | 55.15 |
| d7 | 0.99 | 6.55 | 7.50 |
| d12 | 7.45 | 1.89 | 0.94 |
| d13 | 10.44 | 8.26 | 0.94 |
| d18 | 1.72 | 2.31 | 4.29 |
| d21 | 1.99 | 3.58 | 8.92 |
| d27 | 0.37 | 0.37 | 0.37 |

Unit focal length

| f1 = 16.22 | f2 = −8.42 | f3 = 8.65 | f4 = −9.00 | f5 = 16.19 |

Example 2

Unit mm

Surface data

| Surface no. | r | d | nd | νd |
|---|---|---|---|---|
| Object plane | ∞ | ∞ | | |
| 1 | 72.036 | 0.70 | 2.00069 | 25.46 |
| 2 | 11.062 | 1.94 | | |
| 3 | ∞ | 8.17 | 1.84666 | 23.78 |
| 4 | ∞ | 0.20 | | |
| 5* | 14.487 | 2.66 | 1.69350 | 53.20 |
| 6* | −13.507 | −0.50 | | |
| 7 | ∞ | Variable | | |
| 8* | −12.656 | 0.70 | 1.77377 | 47.17 |
| 9* | 61.290 | 0.34 | | |
| 10 | −68.835 | 1.12 | 1.94595 | 17.98 |
| 11 | −14.494 | 0.50 | 1.77250 | 49.60 |
| 12 | 17.290 | Variable | | |
| 13(stop) | ∞ | Variable | | |
| 14* | 9.906 | 2.70 | 1.49650 | 81.53 |
| 15* | −16.014 | 0.20 | | |
| 16 | 9.235 | 2.06 | 1.49700 | 81.61 |
| 17 | 210.938 | 0.50 | 1.60342 | 38.03 |
| 18 | 23.872 | Variable | | |
| 19 | 20.906 | 0.50 | 1.90366 | 31.32 |
| 20 | 4.510 | 2.11 | 1.49700 | 81.61 |
| 21* | 9.360 | Variable | | |
| 22* | 15.961 | 2.25 | 1.53071 | 55.60 |
| 23* | −20.066 | 4.44 | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | Variable | | |
| Image plane (Light receiving surface) | ∞ | | | |

Aspherical surface data

5th surface k = 0.000
A4 = −5.33049e−05, A6 = −8.78355e−07, A8 = 7.00933e−08,
A10 = −2.92194e−09
6th surface k = 0.000
A4 = 1.09800e−04, A6 = −2.10331e−07, A8 = 3.47631e−08,
A10 = −2.20072e−09
8th surface k = 0.000
A4 = 2.12359e−04, A6 = −1.43073e−05, A8 = 2.17913e−06,
A10 = −8.19098e−08
9th surface k = 0.000
A4 = −1.29404e−06, A6 = −3.49457e−05, A8 = 5.77659e−06,
A10 = −2.36586e−07
14th surface k = 0.000
A4 = −1.66309e−04, A6 = −7.89320e−07, A8 = 3.67215e−08,
A10 = −6.71321e−10
15th surface k = 0.000
A4 = 1.09962e−04, A6 = −9.99558e−07, A8 = 5.95137e−08,
A10 = −8.32521e−10
21st surface k = 0.000
A4 = 3.21183e−04, A6 = 0.00000e−00, A8 = 0.00000e−00,
A10 = 0.00000e−00

-continued

Unit mm

22nd surface k = 0.000
A4 = 4.16527e−04, A6 = −8.97402e−06, A8 = −3.55028e−07,
A10 = 3.16309e−08
23rd surface k = 0.000
A4 = 5.55075e−04, A6 = −1.39024e−05, A8 = −6.00202e−07,
A10 = 4.62669e−08

Zoom data

|  | Wide angle | Intermediate | Telephoto |
|---|---|---|---|
| Focal length | 5.11 | 12.00 | 27.72 |
| Fno. | 3.80 | 5.73 | 6.00 |
| Angle of field 2ω | 84.10 | 34.76 | 15.42 |
| fb (in air) | 6.00 | 6.00 | 6.00 |
| Lens total length (in air) | 56.75 | 56.75 | 56.75 |
| d7 | 0.99 | 4.75 | 7.94 |
| d12 | 7.87 | 4.11 | 0.92 |
| d13 | 11.21 | 6.07 | 0.93 |
| d18 | 2.54 | 3.03 | 3.37 |
| d21 | 1.99 | 6.64 | 11.43 |
| d27 | 0.41 | 0.41 | 0.41 |

Unit focal length f1 = 13.78    f2 = −7.97    f3 = 9.12    f4 = −9.82    f5 = 17.12

Example 3

Unit mm

Surface data

| Surface no. | r | d | nd | vd |
|---|---|---|---|---|
| Object plane | ∞ | ∞ | | |
| 1 | 42.631 | 0.70 | 2.00069 | 25.46 |
| 2 | 9.235 | 2.18 | | |
| 3 | ∞ | 8.20 | 1.84666 | 23.78 |
| 4 | ∞ | 0.20 | | |
| 5* | 17.230 | 2.63 | 1.69350 | 53.20 |
| 6* | −12.023 | −0.50 | | |
| 7 | ∞ | Variable | | |
| 8* | −11.365 | 0.70 | 1.77377 | 47.17 |
| 9* | 50.708 | 0.55 | | |
| 10 | −26.088 | 1.26 | 1.94595 | 17.98 |
| 11 | −9.742 | 0.50 | 1.78590 | 44.20 |
| 12 | 47.844 | Variable | | |
| 13(stop) | ∞ | Variable | | |
| 14* | 7.100 | 2.90 | 1.73077 | 40.50 |
| 15* | −17.435 | 1.04 | | |
| 16 | 346.000 | 0.40 | 2.00069 | 25.46 |
| 17 | 6.089 | 2.61 | 1.49700 | 81.61 |
| 18* | −10.226 | Variable | | |
| 19* | −481.856 | 0.40 | 1.85135 | 40.10 |
| 20* | 9.179 | Variable | | |
| 21* | 14.084 | 2.46 | 1.52540 | 56.25 |
| 22* | −34.499 | 5.06 | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | Variable | | |
| Image plane (Light receiving surface) | ∞ | | | |

-continued

Unit mm

Aspherical surface data

5th surface k = 0.000
A4 = 4.31030e−05, A6 = −1.90397e−06, A8 = 3.92108e−08
6th surface k = 0.000
A4 = 1.93231e−04, A6 = −1.94169e−06, A8 = 7.35064e−08
8th surface k = 0.000
A4 = 2.97425e−04, A6 = 1.69498e−06, A8 = −1.58892e−07
9th surface k = 0.000
A4 = −3.20168e−05, A6 = 1.47819e−05, A8 = −4.78831e−07
14th surface k = 0.000
A4 = −3.55450e−04, A6 = −1.08149e−06, A8 = −1.39957e−07
15th surface k = 0.000
A4 = 2.66236e−04, A6 = 2.47616e−07, A8 = −9.58120e−08
18th surface k = 0.000
A4 = 6.02930e−04, A6 = −4.97979e−05, A8 = 2.42454e−06
19th surface k = 0.000
A4 = −2.25611e−03, A6 = 2.44154e−04, A8 = −3.60034e−06
20th surface k = 0.000
A4 = −2.42320e−03, A6 = 2.71506e−04, A8 = −2.94989e−06
21st surface k = 0.000
A4 = 5.91584e−04, A6 = 2.24888e−05, A8 = −4.75613e−06,
A10 = 1.11282e−07
22nd surface k = 0.000
A4 = 8.25161e−04, A6 = 4.33339e−05, A8 = −7.57162e−06,
A10 = 1.83543e−07

Zoom data

|  | Wide angle | Intermediate | Telephoto |
|---|---|---|---|
| Focal length | 4.98 | 10.50 | 23.93 |
| Fno. | 3.69 | 4.79 | 6.00 |
| Angle of field 2ω | 85.98 | 39.24 | 17.86 |
| fb (in air) | 6.59 | 6.59 | 6.59 |
| Lens total length (in air) | 55.66 | 55.66 | 55.66 |
| d7 | 1.12 | 5.48 | 8.19 |
| d12 | 8.01 | 3.66 | 0.95 |
| d13 | 9.47 | 6.13 | 0.55 |
| d18 | 1.53 | 2.15 | 3.42 |
| d20 | 1.73 | 4.44 | 8.75 |
| d26 | 0.37 | 0.37 | 0.37 |

Unit focal length f1 = 14.07    f2 = −8.12    f3 = 9.09    f4 = −10.58    f5 = 19.37

Example 4

Unit mm

Surface data

| Surface no. | r | d | nd | νd |
|---|---|---|---|---|
| Object plane | ∞ | ∞ | | |
| 1 | −196.178 | 0.80 | 2.00178 | 19.32 |
| 2 | 15.848 | 1.13 | | |
| 3 | ∞ | 8.40 | 1.90366 | 31.31 |
| 4 | ∞ | 0.30 | | |
| 5* | 11.321 | 2.80 | 1.82080 | 42.71 |
| 6* | −20.878 | Variable | | |
| 7* | −14.827 | 0.50 | 1.86400 | 40.58 |
| 8* | 6.152 | 1.02 | | |
| 9 | −22.296 | 0.45 | 1.88300 | 40.80 |
| 10 | 9.189 | 1.15 | 1.92286 | 18.90 |
| 11 | 161.222 | Variable | | |
| 12* | 15.489 | 1.10 | 1.67790 | 55.34 |
| 13* | −18.884 | 0.20 | | |
| 14(stop) | ∞ | Variable | | |
| 15* | 11.647 | 2.86 | 1.62299 | 58.12 |
| 16 | −7.052 | 0.54 | 1.84666 | 23.78 |
| 17 | −12.334 | Variable | | |
| 18 | −34.753 | 0.50 | 2.00069 | 25.46 |
| 19 | 6.089 | 2.25 | 1.49710 | 81.56 |
| 20* | −248.863 | Variable | | |
| 21 | 98.752 | 2.15 | 2.00330 | 28.27 |
| 22 | −13.570 | 3.43 | | |
| 23 | ∞ | 0.50 | 1.51680 | 64.20 |
| 24 | ∞ | 0.50 | | |
| 25 | ∞ | 0.50 | 1.51680 | 64.20 |
| 26 | ∞ | Variable | | |
| Image plane (Light receiving surface) | ∞ | | | |

Aspherical surface data

5th surface k = 0.000
A4 = −1.17199e−04, A6 = 4.67326e−07, A8 = −4.83899e−09,
A10 = −4.98500e−10

6th surface k = 0.000
A4 = 8.62164e−05, A6 = 1.22948e−06, A8 = −4.70691e−08,
A10 = 2.02796e−10

7th surface k = 0.000
A4 = 3.41203e−04, A6 = 2.11567e−05, A8 = −3.76402e−07

8th surface k = 0.000
A4 = −6.99718e−04, A6 = 1.42343e−05, A8 = 3.65675e−06

12th surface k = 0.000
A4 = −4.51883e−05, A6 = −1.49311e−04, A8 = 2.39204e−05,
A10 = −1.55430e−06

13th surface k = 0.000
A4 = 7.59634e−05, A6 = −1.11311e−04, A8 = 1.63791e−05,
A10 = −1.06863e−06

15th surface k = 0.000
A4 = −2.07390e−04, A6 = 3.99255e−06, A8 = −2.28648e−07,
A10 = 5.67023e−09

20th surface k = 0.000
A4 = 6.22513e−04, A6 = 9.23295e−06, A8 = −1.97445e−07

Unit mm

Zoom data

| | Wide angle | Intermediate | Telephoto |
|---|---|---|---|
| Focal length | 5.09 | 11.01 | 24.38 |
| Fno. | 3.61 | 4.17 | 5.82 |
| Angle of field 2ω | 81.52 | 37.60 | 17.62 |
| fb (in air) | 4.96 | 4.96 | 4.96 |
| Lens total length (in air) | 54.62 | 54.62 | 54.62 |
| d6 | 0.60 | 4.15 | 6.24 |
| d11 | 6.15 | 2.59 | 0.50 |
| d14 | 11.15 | 6.69 | 1.37 |
| d17 | 4.25 | 6.61 | 8.61 |
| d20 | 1.37 | 3.48 | 6.80 |
| d26 | 0.36 | 0.36 | 0.36 |

Unit focal length f1 = 11.59  f2 = −3.97  f3 = 12.72  f4 = 11.57  f5 = −9.11  f6 = 12.01

Example 5

Unit mm

Surface data

| Surface no. | r | d | nd | νd |
|---|---|---|---|---|
| Object plane | ∞ | ∞ | | |
| 1 | −74.688 | 0.80 | 2.00178 | 19.32 |
| 2 | 18.062 | 0.90 | | |
| 3 | ∞ | 8.40 | 1.90366 | 31.31 |
| 4 | ∞ | 0.30 | | |
| 5* | 13.524 | 2.41 | 1.85135 | 40.10 |
| 6* | −19.760 | Variable | | |
| 7* | −11.691 | 0.50 | 1.86400 | 40.58 |
| 8* | 8.143 | 0.94 | | |
| 9 | −26.513 | 0.45 | 1.88300 | 40.80 |
| 10 | 10.984 | 1.07 | 1.92286 | 18.90 |
| 11 | 150.986 | Variable | | |
| 12* | 14.107 | 1.06 | 1.67790 | 55.34 |
| 13* | −24.947 | 0.19 | | |
| 14(stop) | ∞ | Variable | | |
| 15* | 10.009 | 2.80 | 1.58913 | 61.25 |
| 16 | −9.420 | 0.54 | 1.84666 | 23.78 |
| 17 | −14.973 | Variable | | |
| 18 | 24.934 | 0.50 | 2.00069 | 25.46 |
| 19 | 4.813 | 1.98 | 1.49710 | 81.56 |
| 20* | 11.187 | Variable | | |
| 21 | 38.472 | 2.40 | 1.91082 | 35.25 |
| 22 | −14.890 | 3.38 | | |
| 23 | ∞ | 0.50 | 1.51680 | 64.20 |
| 24 | ∞ | 0.50 | | |
| 25 | ∞ | 0.50 | 1.51680 | 64.20 |
| 26 | ∞ | Variable | | |
| Image plane (Light receiving surface) | ∞ | | | |

Aspherical surface data

5th surface k = 0.000
A4 = −7.67439e−05, A6 = 4.10716e−07, A8 = −7.43738e−09,
A10 = −6.37897e−10

6th surface k = 0.000
A4 = 7.87668e−05, A6 = 8.34205e−07, A8 = −2.04326e−08,
A10 = −1.97789e−10

7th surface k = 0.000
A4 = 6.39087e−04, A6 = 6.64459e−06, A8 = 8.57390e−08

-continued

Unit mm

8th surface k = 0.000
A4 = −1.77657e−04, A6 = 6.69729e−06, A8 = 2.82839e−06

12th surface k = 0.000
A4 = 7.99065e−04, A6 = −2.28138e−05, A8 = 1.39836e−05,
A10 = −3.21881e−07

13th surface k = 0.000
A4 = 9.51938e−04, A6 = −7.71503e−06, A8 = 1.16142e−05,
A10 = −8.07058e−08

15th surface k = 0.000
A4 = −1.89871e−04, A6 = 5.37175e−07, A8 = −7.53240e−08,
A10 = 1.11305e−09

20th surface k = 0.000
A4 = 5.33973e−04, A6 = 2.31184e−05, A8 = −1.24374e−06

Zoom data

|  | Wide angle | Intermediate | Telephoto |
|---|---|---|---|
| Focal length | 5.13 | 12.00 | 27.71 |
| Fno. | 3.80 | 4.60 | 6.00 |
| Angle of field 2ω | 81.16 | 34.50 | 15.64 |
| fb (in air) | 4.91 | 4.91 | 4.91 |
| Lens total length (in air) | 56.75 | 56.75 | 56.75 |
| d6 | 0.60 | 4.79 | 7.30 |
| d11 | 7.21 | 3.02 | 0.50 |
| d14 | 13.71 | 7.41 | 1.44 |
| d17 | 3.14 | 5.30 | 7.30 |
| d20 | 1.93 | 6.08 | 10.06 |
| d26 | 0.37 | 0.37 | 0.37 |

Unit focal length f1 = 12.89  f2 = −4.43  f3 = 13.44  f4 = 11.84  f5 = −9.00  f6 = 12.04

Aberration diagrams at the time of the infinite object point focusing of the first embodiment, the second embodiment, the third embodiment, the fourth embodiment, and the fifth embodiment are shown in FIG. 2A to FIG. 2L, FIG. 4A to FIG. 4L, FIG. 6A to FIG. 6L, FIG. 8A to FIG. 8L, and FIG. 10A to FIG. 10L respectively. In each diagram, 'IH' shows a maximum image height.

FIGS. 2A to 2L are aberration diagrams of the zoom lens according to the first embodiment in the state in which the zoom lens is focused on an object point at infinity. FIGS. 2A, 2B, 2C, and 2D respectively show spherical aberration (SA), astigmatism (AS), distortion (DT), and chromatic aberration of magnification (CC) of the zoom lens at the wide angle end. FIGS. 2E, 2F, 2G, and 2H respectively show spherical aberration, astigmatism, distortion, and chromatic aberration of magnification of the zoom lens in the intermediate focal length state. FIGS. 2I, 2J, 2K, and 2L respectively show spherical aberration, astigmatism, distortion, and chromatic aberration of magnification of the zoom lens at the telephoto end.

FIGS. 4A to 4L are aberration diagrams of the zoom lens according to the second embodiment in the state in which the zoom lens is focused on an object point at infinity. FIGS. 4A, 4B, 4C, and 4D respectively show spherical aberration (SA), astigmatism (AS), distortion (DT), and chromatic aberration of magnification (CC) of the zoom lens at the wide angle end. FIGS. 4E, 4F, 4G, and 4H respectively show spherical aberration, astigmatism, distortion, and chromatic aberration of magnification of the zoom lens in the intermediate focal length state. FIGS. 4I, 4J, 4K, and 4L respectively show spherical aberration, astigmatism, distortion, and chromatic aberration of magnification of the zoom lens at the telephoto end.

FIGS. 6A to 6L are aberration diagrams of the zoom lens according to the third embodiment in the state in which the zoom lens is focused on an object point at infinity. FIGS. 6A, 6B, 6C, and 6D respectively show spherical aberration (SA), astigmatism (AS), distortion (DT), and chromatic aberration of magnification (CC) of the zoom lens at the wide angle end. FIGS. 6E, 6F, 6G, and 6H respectively show spherical aberration, astigmatism, distortion, and chromatic aberration of magnification of the zoom lens in the intermediate focal length state. FIGS. 6I, 6J, 6K, and 6L respectively show spherical aberration, astigmatism, distortion, and chromatic aberration of magnification of the zoom lens at the telephoto end.

FIGS. 8A to 8L are aberration diagrams of the zoom lens according to the fourth embodiment in the state in which the zoom lens is focused on an object point at infinity. FIGS. 8A, 8B, 8C, and 8D respectively show spherical aberration (SA), astigmatism (AS), distortion (DT), and chromatic aberration of magnification (CC) of the zoom lens at the wide angle end. FIGS. 8E, 8F, 8G, and 8H respectively show spherical aberration, astigmatism, distortion, and chromatic aberration of magnification of the zoom lens in the intermediate focal length state. FIGS. 8I, 8J, 8K, and 8L respectively show spherical aberration, astigmatism, distortion, and chromatic aberration of magnification of the zoom lens at the telephoto end.

FIGS. 10A to 10L are aberration diagrams of the zoom lens according to the fifth embodiment in the state in which the zoom lens is focused on an object point at infinity. FIGS. 10A, 10B, 10C, and 10D respectively show spherical aberration (SA), astigmatism (AS), distortion (DT), and chromatic aberration of magnification (CC) of the zoom lens at the wide angle end. FIGS. 10E, 10F, 10G, and 10H respectively show spherical aberration, astigmatism, distortion, and chromatic aberration of magnification of the zoom lens in the intermediate focal length state. FIGS. 10I, 10J, 10K, and 10L respectively show spherical aberration, astigmatism, distortion, and chromatic aberration of magnification of the zoom lens at the telephoto end.

Next, parameter and values of conditional expressions in each embodiment are described.

|  | Example 1 | Example 2 | Example 3 |
|---|---|---|---|
| (1) $1 - \beta_5$ | 0.40 | 0.40 | 0.40 |
| (2) $f_4/f_w$ | −1.76 | −1.92 | −2.12 |
| (3) $f_1/f_w$ | 3.17 | 2.70 | 2.82 |
| (4) $f_2/f_w$ | −1.65 | −1.56 | −1.63 |
| (5) $f_3/f_w$ | 1.69 | 1.79 | 1.82 |

|  | Example 4 | Example 5 |
|---|---|---|
| (6) $1 - \beta_6$ | 0.42 | 0.44 |
| (7) $f_4/f_w$ | 2.27 | 2.31 |
| (8) $f_5/f_w$ | −1.79 | −1.75 |
| (9) $f_1/f_w$ | 2.28 | 2.51 |

(Digital Camera)

The image pickup apparatus according to the present invention that forms an image of an object by a zoom lens and picks up the image by receiving it by an electronic image pickup element such as a CCD can be applied to an electronic image pickup apparatus, in particular to a digital camera or a video camera. In the following, an embodiment of the electronic image pickup apparatus will be described.

Figure 11:
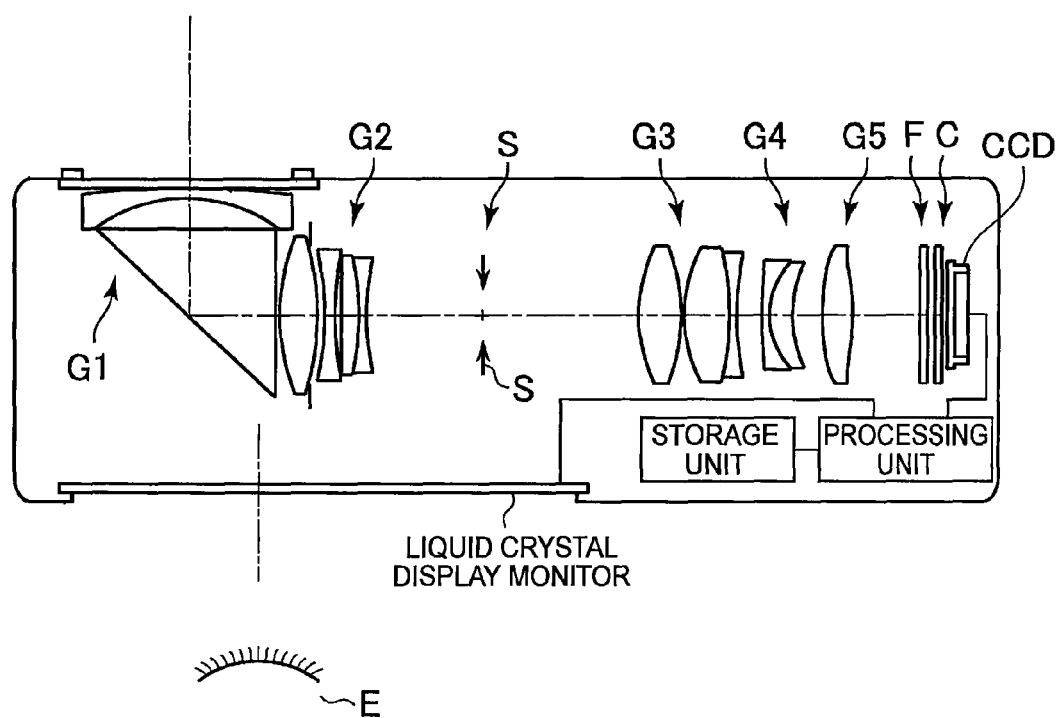
FIG. 11 is a cross sectional view of a digital camera equipped with a zoom lens according to the present invention.

FIG. 11 is a cross sectional view showing the construction of a digital camera in which a zoom lens according to the present invention is used as the taking optical system. The digital camera illustrated in FIG. 11 uses the zoom lens according to the first embodiment as the optical system. In the zoom lens optical system, the first lens unit G1 includes a reflecting member that bends the optical path by 90 degrees disposed between the third surface r3 and the fourth surface r4.

Rays entering the zoom lens optical system form an image on the image pickup surface (Light receiving surface) of a CCD after passing through an near-infrared cut filter and an optical low pass filter F shown in the right portion in the cross sectional view. The image of an object received by the CCD is processed by the processing unit and displayed as an electronic image on a liquid crystal display monitor provided on the back of the camera. The processing unit is connected with a storage unit, in which picked up electronic images can be stored. The storage unit may be provided separately from the processing unit. The storage unit may be an electrically writable medium such as a flexible disk, memory card, or MO. The camera may be modified into a film camera, in which the CCD is replaced by a photographic film (silver-halide film).

The digital camera having the above-described construction is equipped with a taking optical system according to the present invention, which has a sufficiently wide angle of view, a high zoom ratio, and very stable imaging performance throughout the entire zoom range while being compact. Therefore, excellent performance, smallness in size, and wide angle of view can be achieved. Moreover, quick focusing in the wide angle and telephoto focal length ranges and image stabilization with a simple structure can be realized.

As described above, the zoom lens and the image pickup apparatus according to the present invention is useful when excellent optical performance and smallness in size are both to be achieved.

The present invention can provide a zoom lens that can perform image stabilization with a simple mechanism by shifting the rearmost lens unit that is fixed during zooming in directions perpendicular to the optical axis without significant deterioration in the performance.

What is claimed is:

1. A zoom lens comprising, in order from the object side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
during zooming from the wide angle end to the telephoto end, the first lens unit is fixed, the second lens unit moves toward the image side, the third lens unit moves toward the object side, the fourth lens unit moves, and the fifth lens unit is fixed,
the first lens unit comprises a reflecting member that bends the optical path by 90 degrees,
the entirety of or at least a part of the fifth lens unit is shifted in directions transverse to the optical axis to stabilize a picked-up image when the optical system vibrates, and
the zoom lens satisfies the following conditional expressions (1) and (2):

$$0.28 < 1-\beta_5 < 1.0 \quad (1), \text{ and}$$

$$-2.2 < f_4/f_w < -1.0 \quad (2),$$

where $\beta_5$ is the image magnification of the fifth lens unit in the entire zoom range with the zoom lens being focused on an object point at infinity, $f_4$ is the focal length of the fourth lens unit, and $f_w$ is the focal length of the entire zoom lens system at the wide angle end.

2. The zoom lens according to claim 1, wherein the zoom lens satisfies the following conditional expression (3), $$2.0 < f_1/f_w < 3.4 \quad (3),$$

where $f_1$ is the focal length of the first lens unit.

3. The zoom lens according to claim 1, wherein the zoom lens satisfies the following conditional expression (4):

$$-3 < f_2/f_w < -1 \quad (4),$$

where $f_2$ is the focal length of the second lens unit.

4. The zoom lens according to claim 1, wherein the zoom lens satisfies the following conditional expression (5):

$$1.2 < f_3/f_w < 2.2 \quad (5),$$

where $f_3$ is the focal length of the third lens unit.

5. The zoom lens according to claim 1, wherein focusing from an infinite object distance to a short distance is performed by moving the fourth lens unit.

6. A zoom lens comprising, in order from the object side:
a first lens unit having a positive refractive power;
a second lens unit having a negative refractive power;
a third lens unit having a positive refractive power;
a fourth lens unit having a positive refractive power;
a fifth lens unit having a negative refractive power; and
a sixth lens unit having a positive refractive power, wherein
during zooming from the wide angle end to the telephoto end, the first lens unit is fixed, the second lens unit moves toward the image side, the third lens unit is fixed, the fourth lens unit moves toward the object side, the fifth lens unit moves, and the sixth lens unit is fixed,
the first lens unit comprises a reflecting member that bends the optical path by 90 degrees,
the entirety of or at least a part of the sixth lens unit is shifted in directions transverse to the optical axis to stabilize a picked-up image when the optical system vibrates, and
the zoom lens satisfies the following conditional expressions (6), (7), and (8):

$$0.34 < 1-\beta_6 < 1.0 \quad (6),$$

$$1.6 < f_4/f_w < 2.6 \quad (7), \text{ and}$$

$$-3.0 < f_5/f_w < -1.3 \quad (8),$$

where $\beta_6$ is the image magnification of the sixth lens unit in the entire zoom range with the zoom lens being focused on an object point at infinity, $f_4$ is the focal length of the fourth lens unit, $f_5$ is the focal length of the fifth lens unit, and $f_w$ is the focal length of the entire zoom lens system at the wide angle end.

7. The zoom lens according to claim 6, wherein the zoom lens satisfies the following conditional expression (9):

$$2.0 < f_1/f_w < 2.8 \quad (9),$$

where $f_1$ is the focal length of the first lens unit.

8. The zoom lens according to claim 6, wherein focusing from an infinite object distance to a short distance is performed by moving the fifth lens unit.

* * * * *